United States Patent [19]

Wallace

[11] Patent Number: 4,686,623
[45] Date of Patent: Aug. 11, 1987

[54] PARSER-BASED ATTRIBUTE ANALYSIS
[75] Inventor: David R. Wallace, Winchester, Mass.
[73] Assignee: International Business Machines Corporation, Armonk, N.Y.
[21] Appl. No.: 742,493
[22] Filed: Jun. 7, 1985
[51] Int. Cl.⁴ .............................................. G06F 9/44
[52] U.S. Cl. ..................................................... 364/300
[58] Field of Search ........................................... 364/300
[56] References Cited

U.S. PATENT DOCUMENTS 4,398,249  8/1983  Pardo et al. ............................ 364/300

OTHER PUBLICATIONS

American National Standard Programming Language PL/1, published in 1976 by American National Standards Institute, Inc., pp. 80–93.

Primary Examiner—Raulfe B. Zache
Attorney, Agent, or Firm—Sughrue, Mion, Zinn, Macpeak, and Seas

[57] ABSTRACT

A table-driven attribute parser for checking the consistency and completeness of attribute assignments in a source program is generated by expressing the syntax rules, semantic restrictions and default assignments as a single context-free grammar compatible with a grammar processor, or parser generator, and processing the context-free grammar to generate an attribute parser including a syntax table and a parse driver. The table-driven attribute parser is incorporated into a compiler.

8 Claims, 43 Drawing Figures

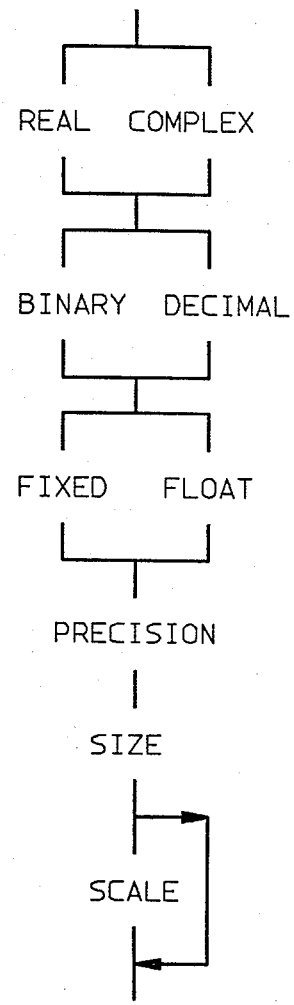
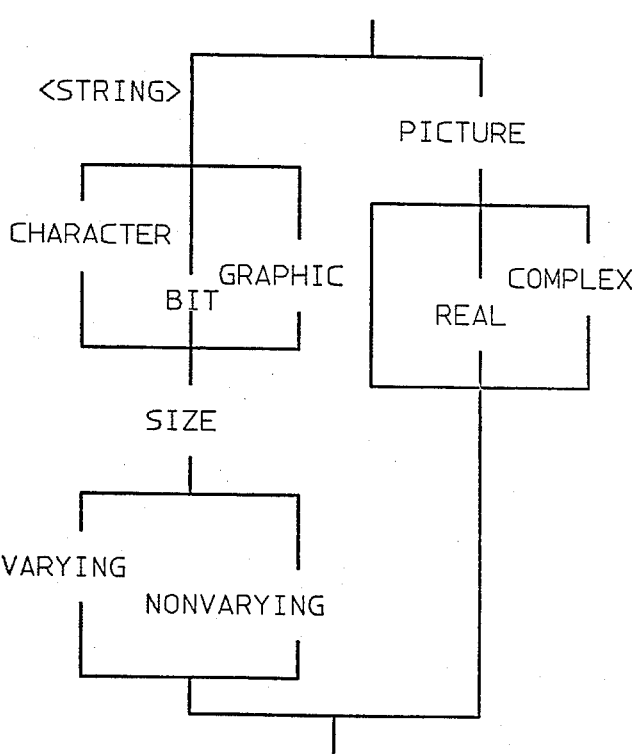
FIG. 7
FIG. 8

PARSER-BASED ATTRIBUTE ANALYSIS

BACKGROUND OF THE INVENTION

The present invention is directed to an improved attribute analysis technique for use in compilers, and more particularly to a parser-based attribute analysis technique for use in compilers. The invention will be described in the context of PL/I programming, although it will be appreciated that this is by way of example only and that the invention is applicable to other programming languages as well.

When creating a program to run on a general purpose computer, the program is first written in source code, and the source code program is then passed through a compiler which converts the source code into object code, or machine language. There are several tasks performed by the compiler before finally generating an object code output, one of these tasks being performed by an "attribute processor" in the compiler front end. More particularly, when writing a PL/I source program, various "attributes" are assigned to data items used in the program, e.g., an item can be assigned the attribute of a variable or a constant, and a variable can be further assigned the attributes of PARAMETER, CONTROLLED, or STATIC. The most common way of assigning these attributes to data items is by way of a DECLARE statement, although attributes can also be assigned by a number of other techniques, e.g., a data description statement, a LIKE statement, or even inferentially by using a data item in a context which would require certain attributes. As generally shown in FIG. 1, the tasks performed by the attribute processor of a PL/I compiler during compilation of a PL/I source program include in a compilers apparatus: the checking of syntax correctness of attributes specified for each declared data item in the defining PL/I DECLARE statement, and representing this initial set of valid attributes in a concise internal notation; and completing the initial attribute set of each data item by providing the appropriate default values for any missing attributes, while checking the consistency and completeness of the final attribute set.

The attribute processor tasks must be performed in accordance with the syntax grammar defined in the American National Standard Institute (ANSI) PL/I standard, particularly chapter 4 thereof. The test for attribute consistency is set forth in §4.3.6.1 at pages 83–85. The purpose of the attribute consistency check is to ensure that no data item has been assigned inconsistent attributes, e.g., REAL and COMPLEX. The completion of the attribute set with default values is described in §§4.3.6.3 through 4.3.6.5 at pages 86–88 of the ANSI PL/I standard. The checking to determine that the final attribute set is complete and consistent is described in §4.3.7.1 at page 93 of the ANSI PL/I standard. The tasks performed by the attribute processor of a PL/I compiler front end are not limited to only those steps set forth in the above-cited sections of the ANSI PL/I standard, but these sections exemplify the grammatical rules which must be followed in the attribute processor.

In conventional PL/I compilers, the attribute analysis is carried out by various ad hoc techniques, whereas default values are added, and completeness and consistency of the final attribute sets checked, by using specialized procedures, e.g., breaking the program down into small parts and sub-parts and then checking from inside to outside. This requires the writing of a great deal of code, typically generated manually by the programmer. This is not only time consuming and quite tedious, but the manual generation of the code is error-prone and substantial debugging of the compiler program is usually required. Investigating and correcting errors in a very long listing is a time consuming process.

Further, even after a working compiler is obtained, it is sometimes necessary to update the compiler to accommodate new or changed language features. As in the original generation of the compiler program, updating and debugging extensive object code listings implementing complex grammatical rules is a task which requires a substantial amount of programmer time.

For the above reasons, the generation of the attribute processor portion of the compiler program by conventional techniques is error prone, inefficient and difficult to adapt to new or changed language features, and it would be highly advantageous to provide a simplified and much faster technique for implementing the attribute processor portion of a compiler.

SUMMARY OF THE INVENTION

It is, therefore, an object of this invention to provide a simplified technique for implementing an attribute processor.

Briefly, this and other objects of the invention are realized by implementing the attribute processor as well as a table-driven attribute parser, and the invention comprises both a table-driven parser in the attribute processor as well as a simple and efficient technique for generating the syntax tables and parse driver which make up the attribute parser. In the parser-based attribute analysis of the present invention, the consistency of attributes of PL/I declarations is checked, and default values for missing attributes are added, based on the efficient and reliable LALR(1) parsing technique. The attribute analysis grammer specified in the ANSI standard is expressed in terms of a context-free grammer which is provided as an input to a LALR(1) grammer processor. In a well-known manner, the grammer processor generates a finite state machine (FSM) consisting of syntax tables and a parse driver. These are included in the complier front end and can be used to check the consistency and completeness of attribute sets while at the same time adding any needed default attributes.

The parser-based attribute analysis of the present invention is a significant improvement over conventional implementations in that it is systematic, efficient and eliminates dealing with special cases. Further, since a parser generator is used to generate the syntax tables and parse driver, the technique of the present invention is far less error prone than conventional techniques requiring programmers to manually generate large amounts of object code. In addition, the attribute processor will be easily modifiable for additional syntax rules or semantic checks.

BRIEF DESCRIPTION OF THE DRAWINGS

The invention will be more clearly understood with reference to the following description in conjunction with the accompanying drawings, wherein:

FIG. 2-11 are diagrams collectively representing a Group 1 grammar during derivation of a context-free PL/I grammar for use in the present invention;

DETAILED DESCRIPTION OF THE INVENTION

Figure 1:
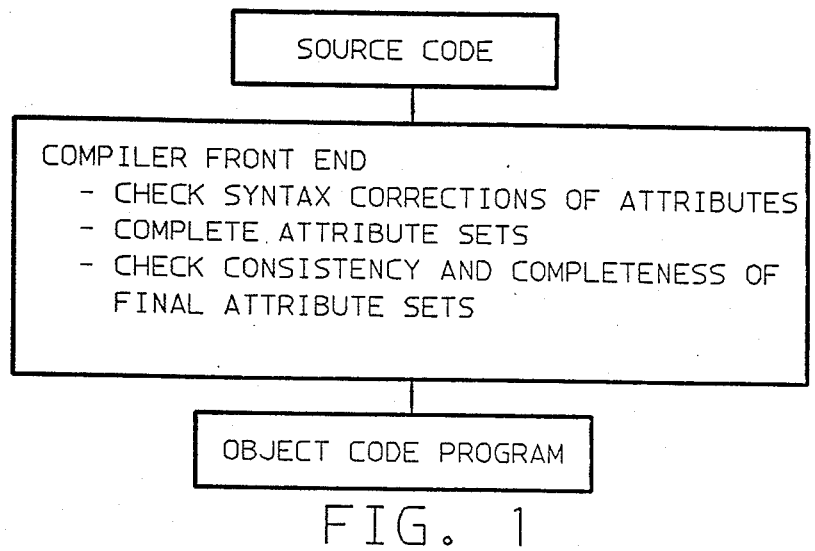
FIG. 1 is a brief conceptual diagram of a compiler operation.
Figure 2:
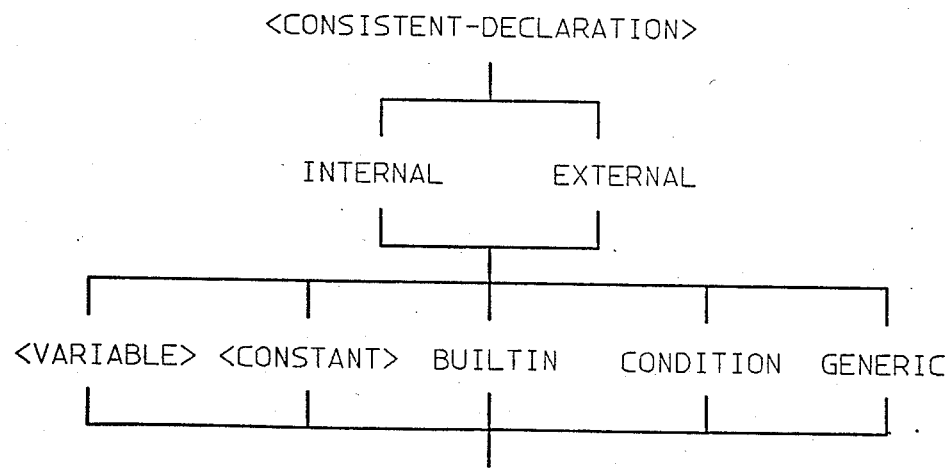

The present invention is based on a recognition by the inventor that the attributes of PL/I declarations, as defined in the ANSI standard, have a syntactic structure which can be expressed as a context-free grammar. Further, the syntax of this grammar can be modified to include the semantic checks required for verifying the consistency of attributes, and the syntax can be structured in such a way that any missing attributes are automatically provided from a set of user-defined and/or system defaults. With such an attribute-checking grammar, a parser generator can be used to create a table-driven attribute parser, i.e., a finite state machine (FSM) consisting of syntax tables and the parse driver, which is capable of checking the consistency and completeness of attribute sets, while at the same time adding any needed default attributes.

After the table-driven attribute parser is generated, all that is necessary is to provide a simple attribute scanner which can supply the attribute parser with attributes from each initial attribute set in the proper order, i.e., the order in which attributes are defined in the attribute grammar, and the attribute parser can then be used to perform the complete attribute analysis. If there is an inconsistency, the parser will reject the stream. Each system default attribute addition is associated with a specific reduction detected by the parser.

The first step in the creation of the attribute parser of the present invention is to derive an attribute checking grammar which can be used by the parser generator. The parser generator is a grammar processor of a type known in the art, e.g., the LALR (1) grammar processor available under the name Translator Writing System from Metaware of Santa Cruz, Calif. As is well-known, this grammar processor, when provided with a suitable context-free grammar definition, will generate a table-driven parser which can parse statements made in that grammar.

For a PL/I compiler, it is necessary to derive a context-free grammar based on the grammar defined in the ANSI PL/I standard at §4.3.6.1, with modifications required for the consistency checking and application of attribute defaults, and also for different language levels, e.g., including desired extensions to the "standard" PL/I. In deriving the context-free grammar, a four-step approach was followed. As mentioned, the ANSI standard PL/I provides a syntax for determining when a set of data attributes is consistent. The consistency check involves steps 4, 5 and 6 of §4.3.6.1 of the Standard entitled "test-attribute-consistency", with steps 4 and 5 being semantic checks and step 6 referring to the syntax. Thus, for the purposes of merely testing the consistency of a given set of attributes, the ANSI syntax is not complete. However, by modifying this syntax, the ANSI semantic consistency checks can be included in the syntax, and the syntax can be made LALR(1).

The ANSI attribute syntax is first represented in a Group 1 grammar, and is then reordered in a Group 2 grammar. The Group 2 syntax incorporates syntactically the semantic restriction in step 5 of §4.3.6.1 of the standard.

The complete syntax for consistency checking must allow all subsets of legal sentences from the Group 2 syntax. This is accomplished in a Group 3 syntax which provides optional skipping over each keyword while still preventing multiple null paths. Then, if a "lexical scanner" is used that produces encoded data attributes in a canonical order, a standard LALR(1) parser may be used to check consistency. When there are user supplied defaults, this consistency checker may be used in the standard ANSI algorithm for processing the user defaults.

By properly structuring the productions in this syntax, the reduction of null rules, or of rules with missing components, can be made to correspond exactly to the required addition of system default attributes. The syntax diagrams for this are shown in a Group 4 grammar, and include references to the system default statements. Thus, a set of attributes can have its consistency checked and system default attributes added in essentially one step. This is done without multiple checks for attribute combinations. A final "Group 5" version is obtained by combining Groups 3 and 4 using a Backus-Naur Form (BNF). This is the final syntax used in the parser generator.

The syntax has 155 rules which, when processed by the YACC parser generator on the UNIX system, produces 168 states and 306 table entries, 240 entries being non-zero.

When there are user-supplied defaults followed by system defaults, i.e., when "NONE" is not used, the user default attributes can be added using the above consistency checker, and afterwards, the process of this invention for adding system defaults can be used to complete and do final checks on the resulting attributes. This avoids the inefficiency of processing system defaults as if they were user defaults.

In addition to the standard consistency checks, there are some "final checks" in "check-attribute-completeness-and-delete-attributes", in §4.3.7.1 of the ANSI PL/I standard, that are done after all default attributes have been added. Some of these final checks are included in the final syntax, while the remainder of the checks can be more easily added not syntactially, but as semantic actions.

The complete derivation of the context-free grammar for use in the LALR(1) parser generator will now be described in detail.

In the first step, a context-free "Group 1" grammar, collectively illustrated in FIGS. 2–11, is created from the original ANSI grammar specified in §4.3.6.1 of the PL/I standard, with the addition of value attributes: "P" with POSITION; SIZE with <string>, PRECISION and AREA; and SCALE with PRECISION. In addition, a GRAPHIC attribute has been added as an extension of the original ANSI grammar. This grammar could be used only for checking that a given attribute set was consistent. Also, the Group 1 grammar is not suitable for input to a LALR(1) type parser generator.

Figure 3:
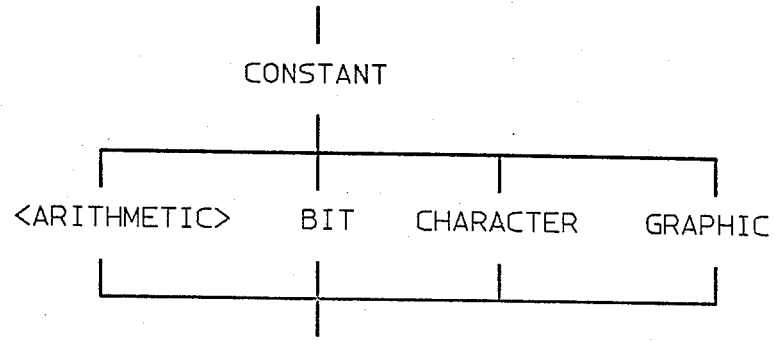

It should be noted that the attribute consistency check, specified in §4.3.6.1 of the ANSI PL/I standard, checks for consistency by verifying that each attribute is contained in a subset of the attributes from some path of the syntax tree having a root-node at either the <consistent-description>, <consistent-literal-constant>, or <consistent-declaration>. FIGS. 2 and 5-11 illustrate the syntax tree for the <consistent-declaration> root-node, FIGS. 3 and 7 illustrate the syntax tree for the <consistent-literal-constant> root-node, and FIGS. 4 and 6-9 illustrate the syntax tree for the <consistent-description> root-node.

In the second stage of grammar derivation, a "Group 2" grammar is created. The Group 2 grammar is collectively illustrated in FIGS. 12-21, which correspond to FIGS. 2-11, respectively. The Group 2 grammar is obtained by reordering the Group 1 grammar in such a way that it incorporates some of the ANSI-specified semantic restrictions on the use of attributes. As can be seen from a review of §4.3.6.1 of the ANSI PL/I standard, it is possible for a <data-description> to be assigned the STRUCTURE attribute while simultaneously being defined as <alignment> data. On the other hand, <alignment> data can be assigned the ALIGNED or UNALIGNED attributes. When diagramming the Group 1 grammar, therefore, the STRUCTURE and <alignment> attributes would appear in the same path. However, Step 5 of §4.3.6.1 of the PL/I standard imposes a semantic restriction that the STRUCTURE attribute and <alignment> attributes cannot be specified together. This semantic restriction is easily incorporated into the Group 2 grammar by moving the <alignment> attributes onto a different path from the path which included the STRUCTURE attribute, i.e., by moving the <alignment> attribute of FIG. 6 to the left-hand branch in FIG. 16.

Figure 4:
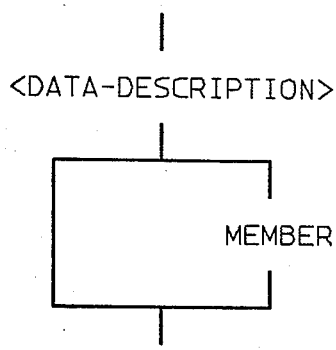
Figure 5:
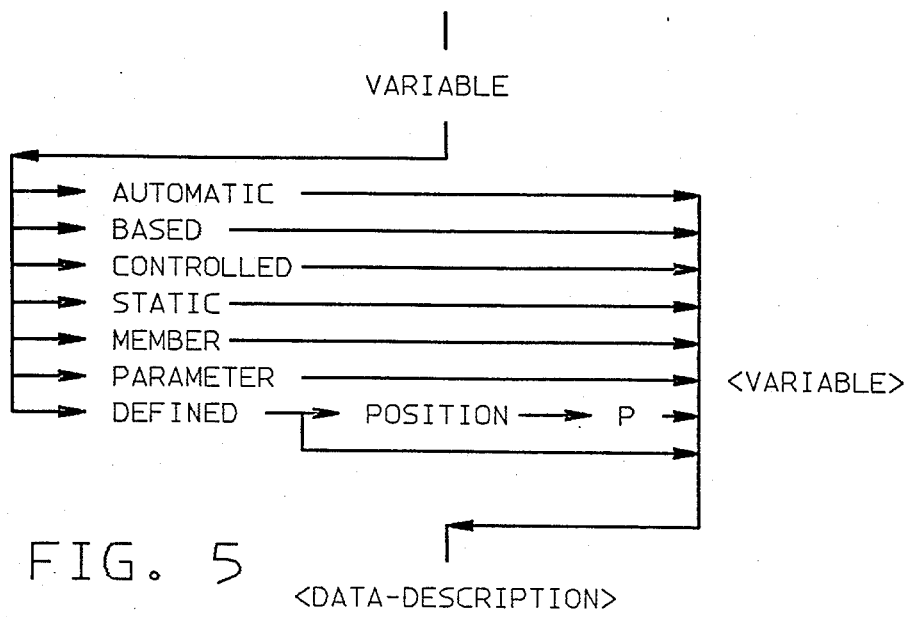
Figure 6:
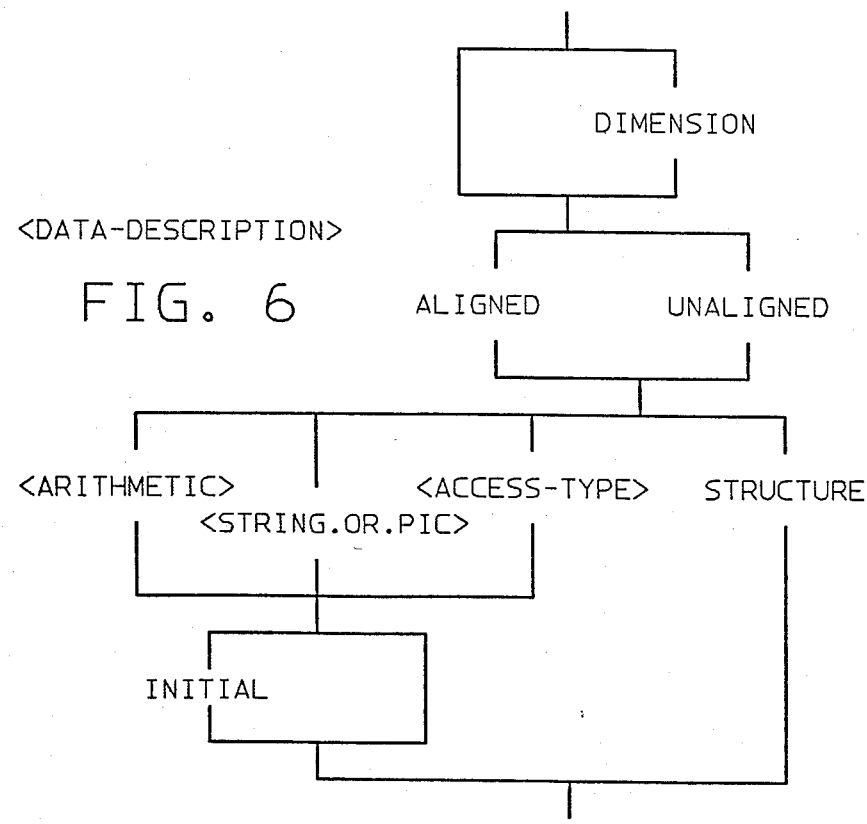
Figure 9:
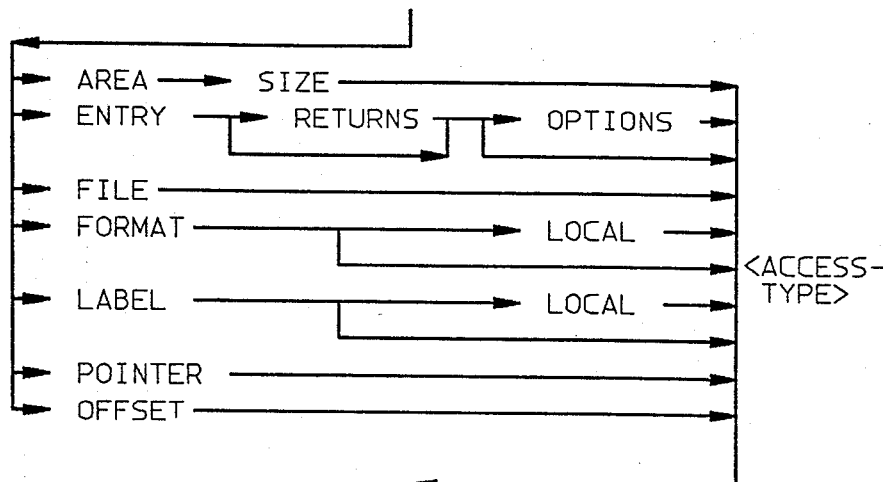
Figure 10:
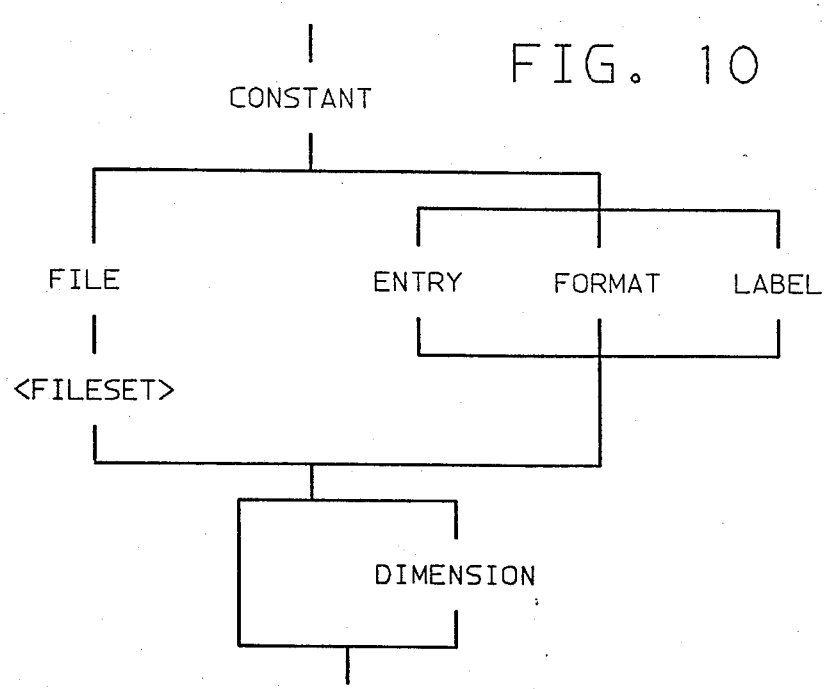
Figure 11:
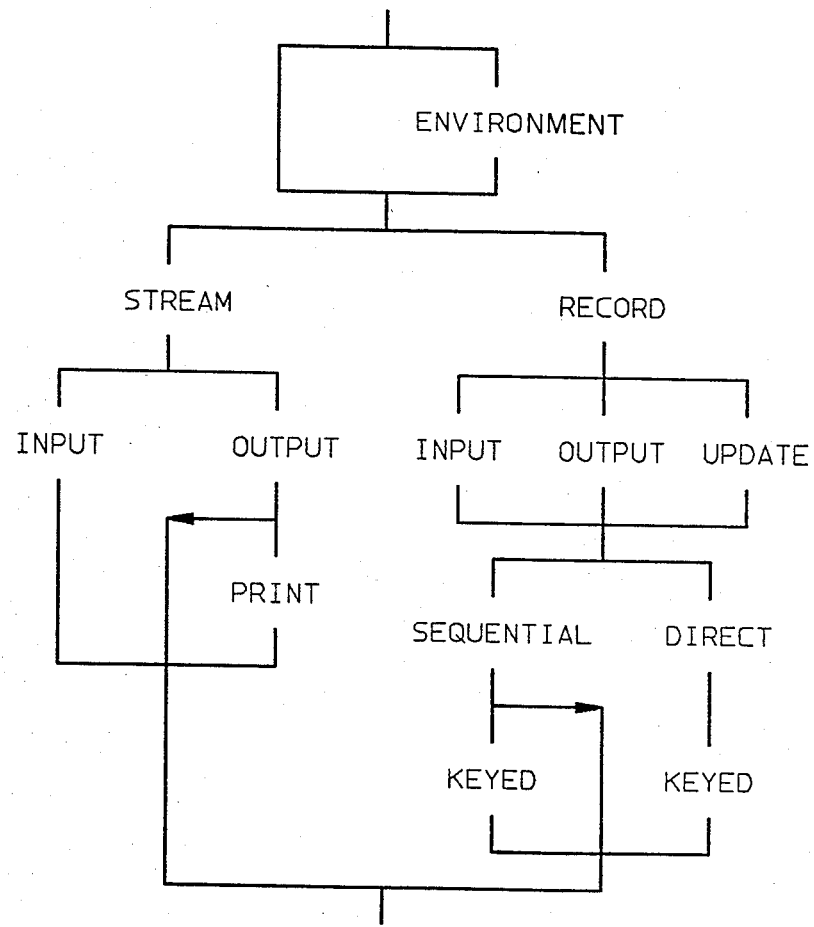
Figure 12:
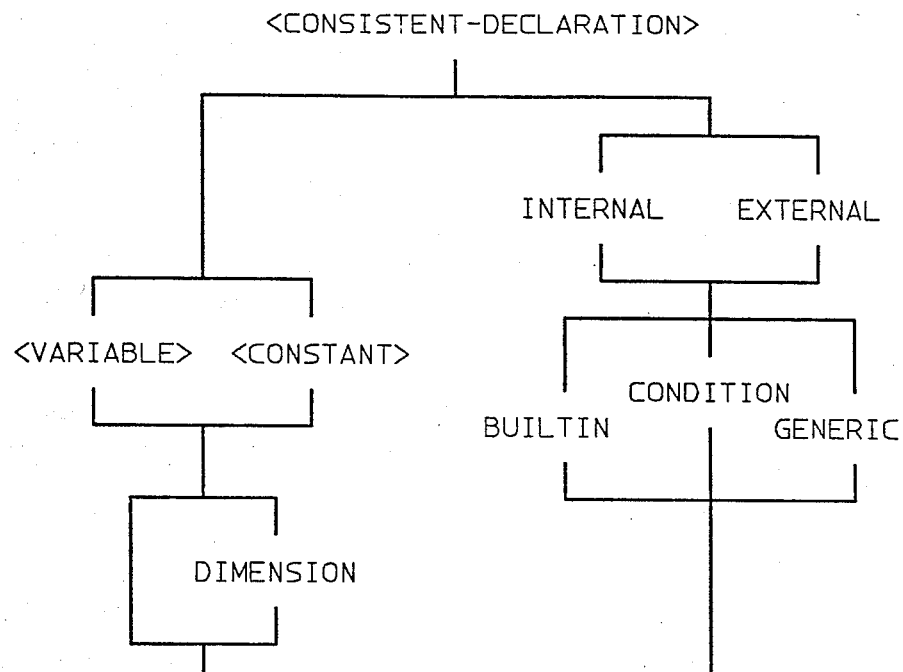
FIG. 12–21 are diagrams collectively representing a Group 2 grammar during a subsequent stage in the derivation of a context-free grammar for use in the present invention.
Figure 13:
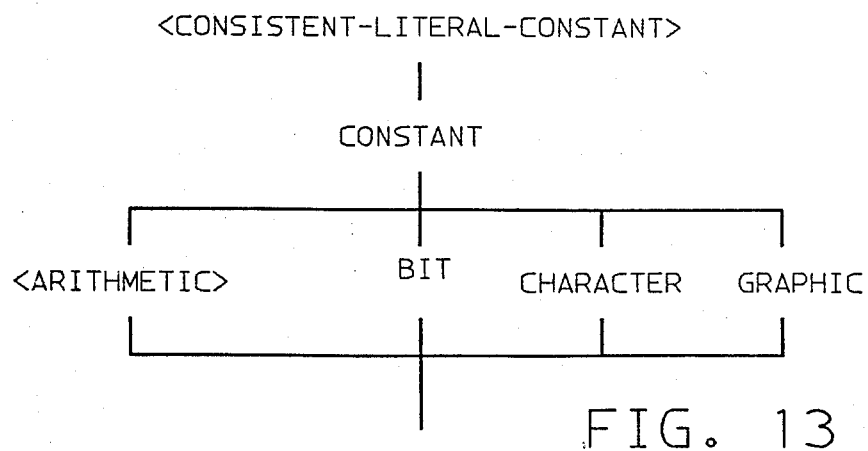
Figure 14:
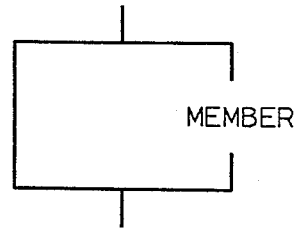
Figure 14:
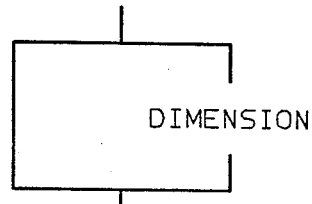
Figure 15:
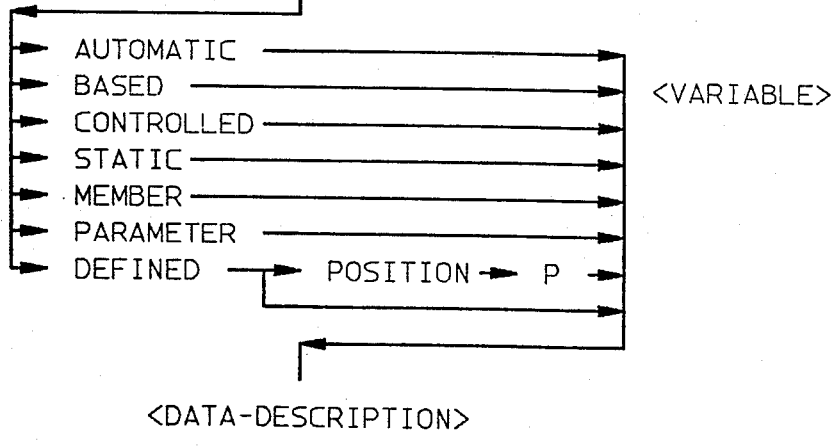

Next, note that DIMENSION is inconsistently ordered, in that it occurs before ENTRY, FILE, FORMAT and LABEL in <variable> (see FIGS. 5, 6 and 9), while it occurs after those same attributes in <constant> (see FIG. 10). Thus, DIMENSION can be factored out of <data-description> (FIG. 6) and <constant> (FIG. 10) and instead added to FIG. 12. Also, MEMBER is inconsistently ordered in that it occurs before <data-description> in the <variable> attributes, whereas it occurs after <data-description> in <consistent-description> (FIG. 4). Thus, MEMBER can be moved in FIG. 4 as shown in FIG. 14.

Figure 16:
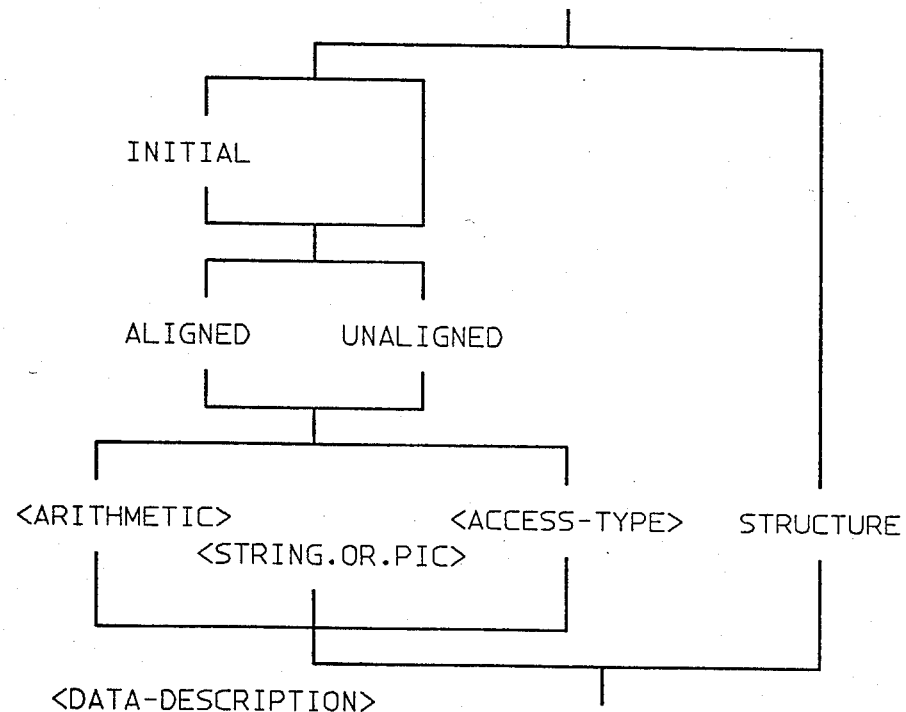
Figure 17:
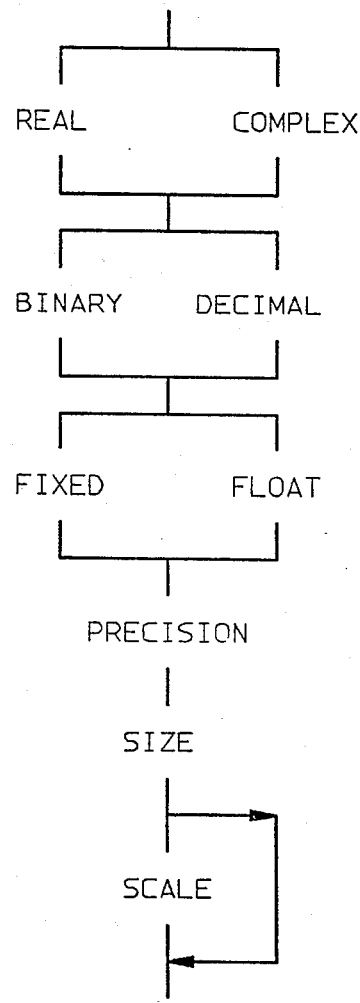
Figure 18:
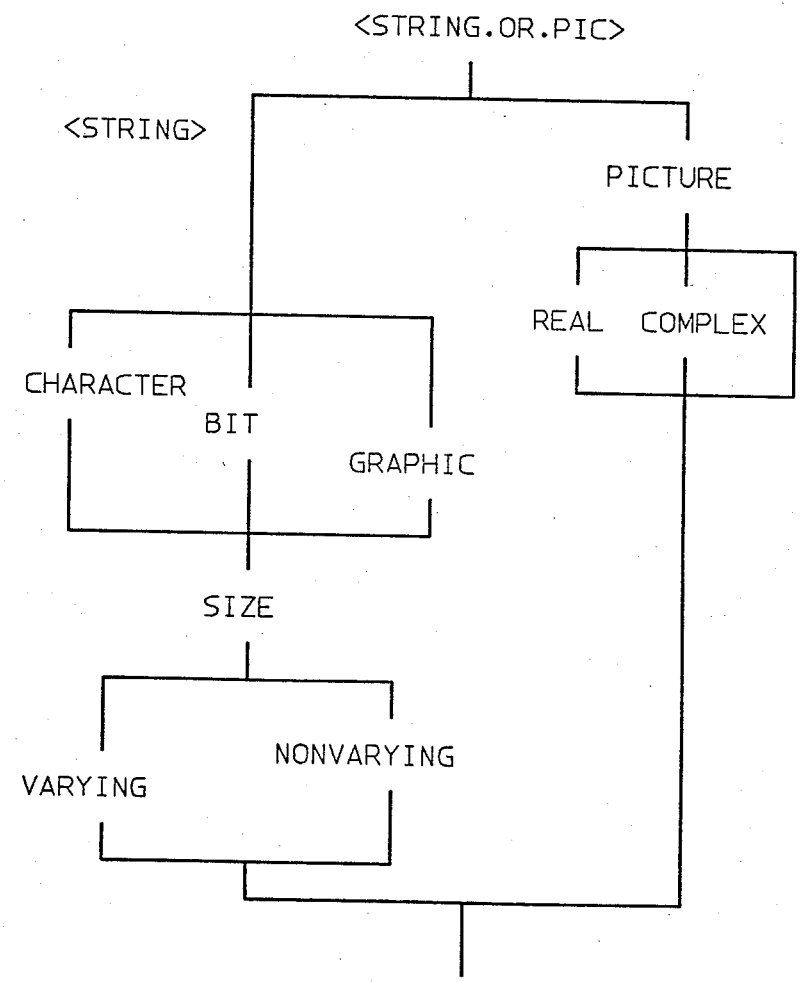
Figure 19:
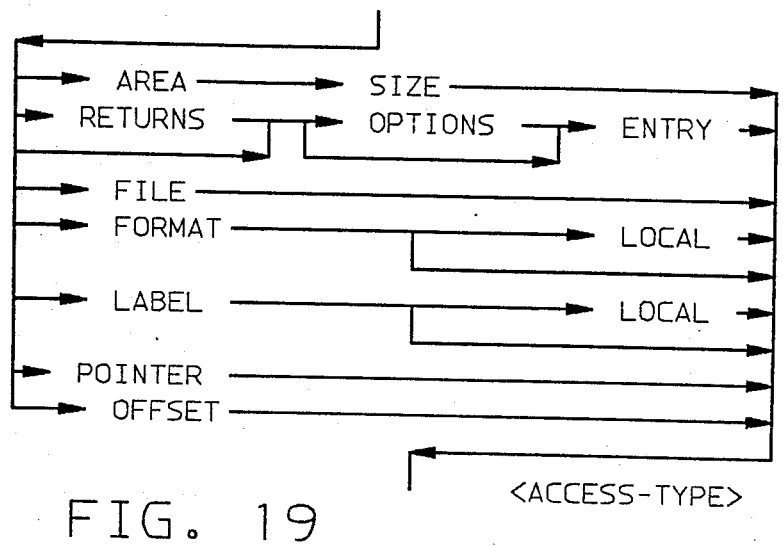
Figure 20:
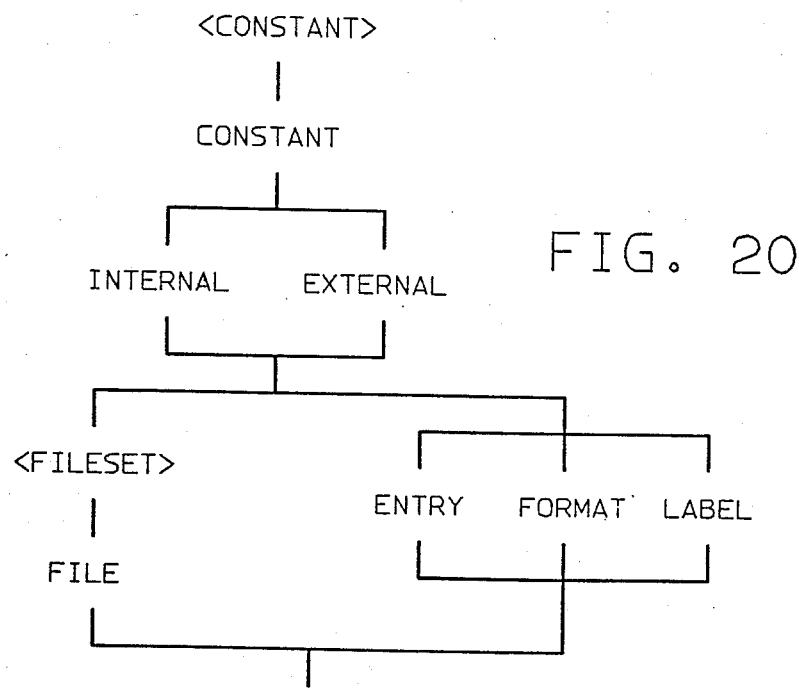
Figure 21:
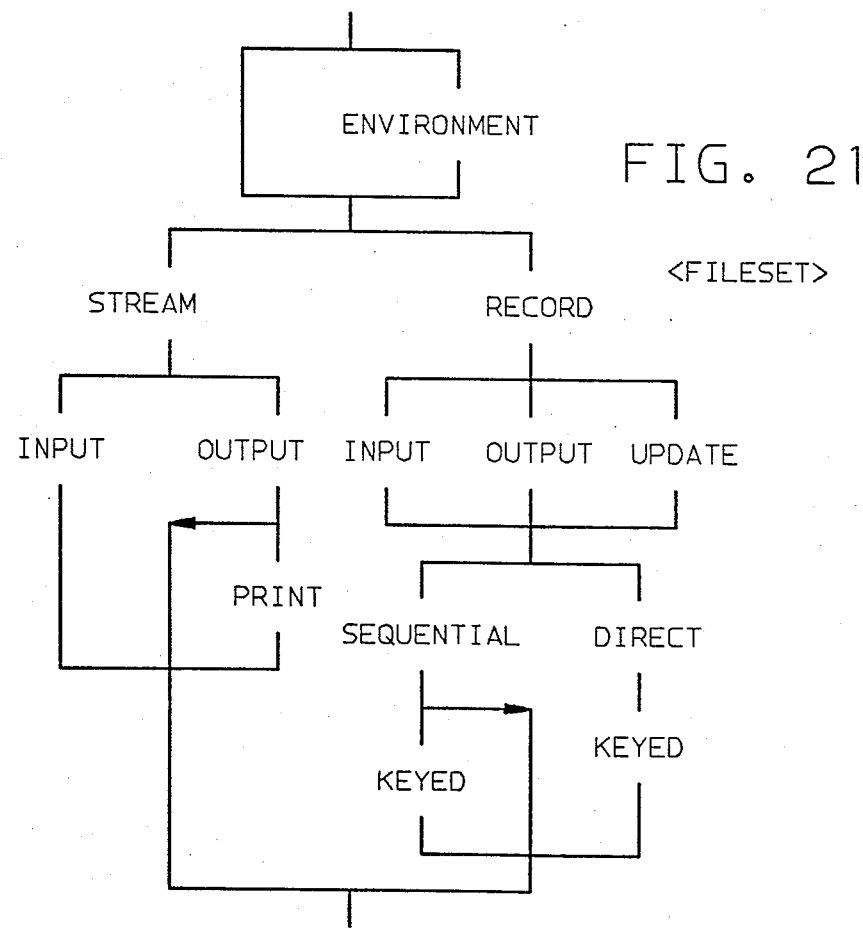
Figure 22:
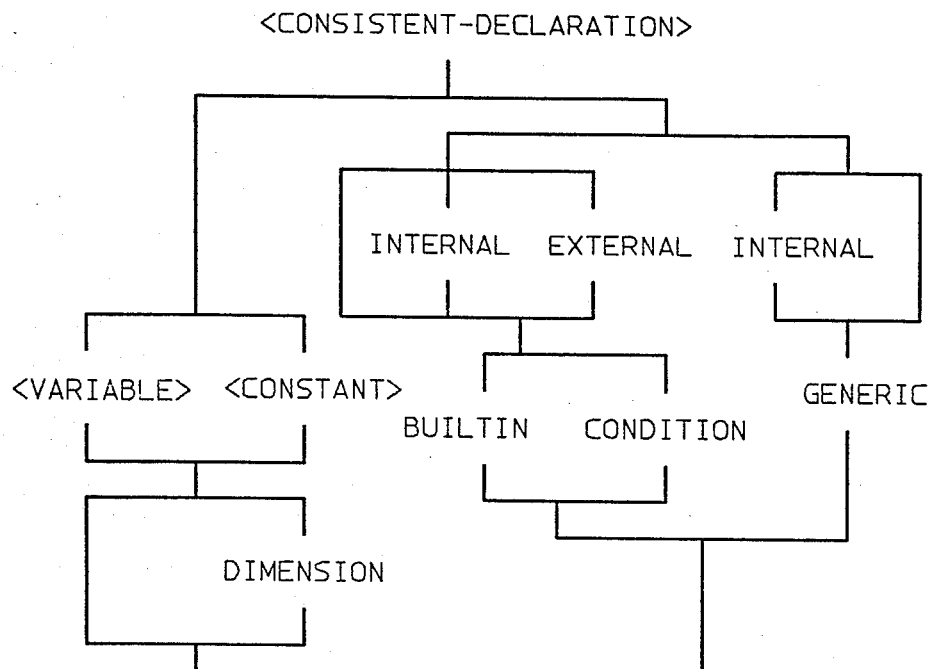
FIG. 22–31 are diagrams collectively illustrating a Group 3 grammar during a subsequent stage in the derivation of a context-free grammar for use in the present invention.
Figure 23:
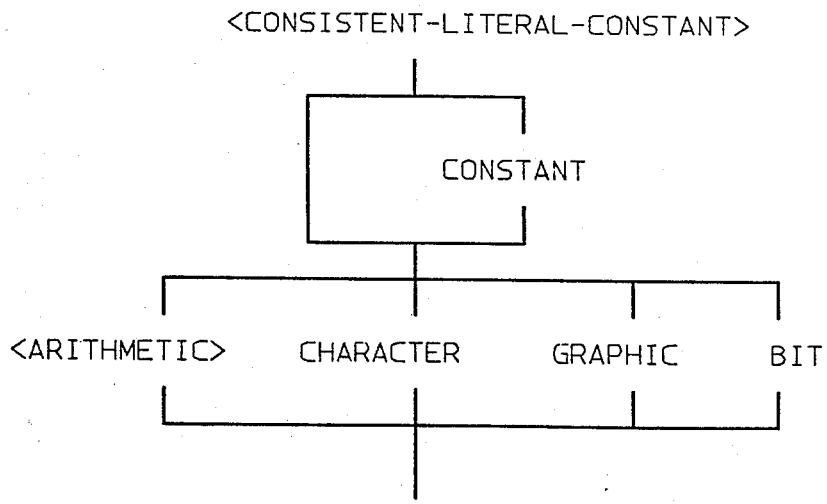
Figure 24:
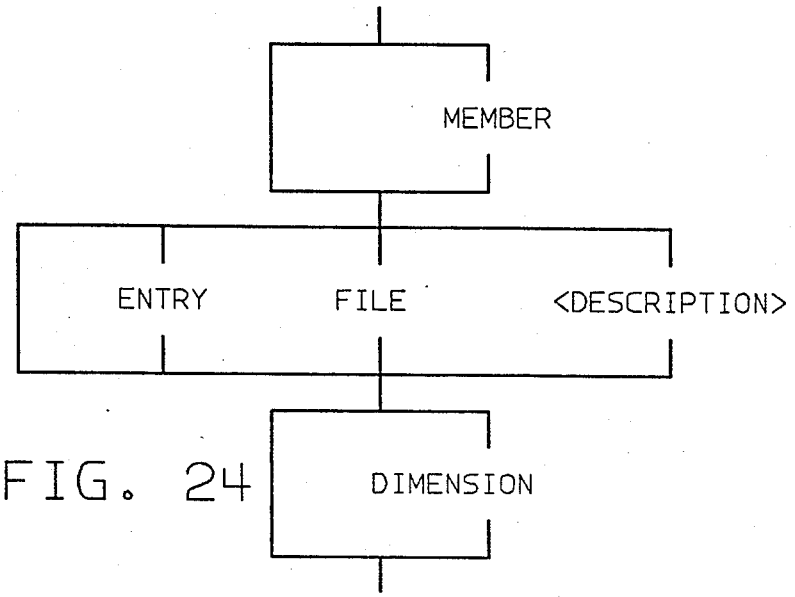
Figure 29:
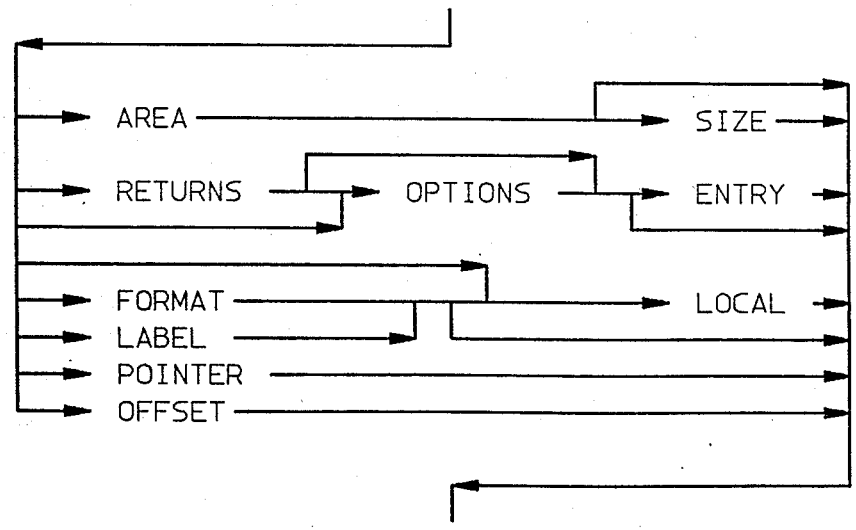
Figure 25:
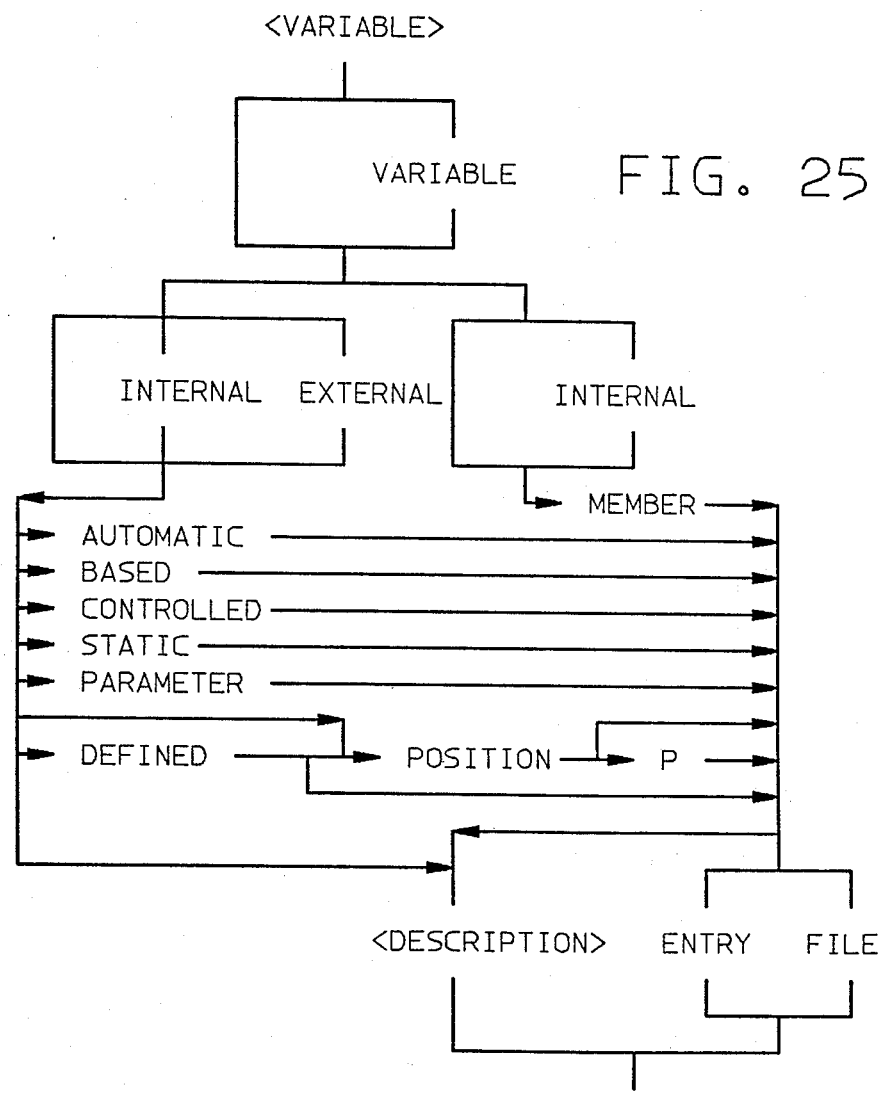
Figure 26:
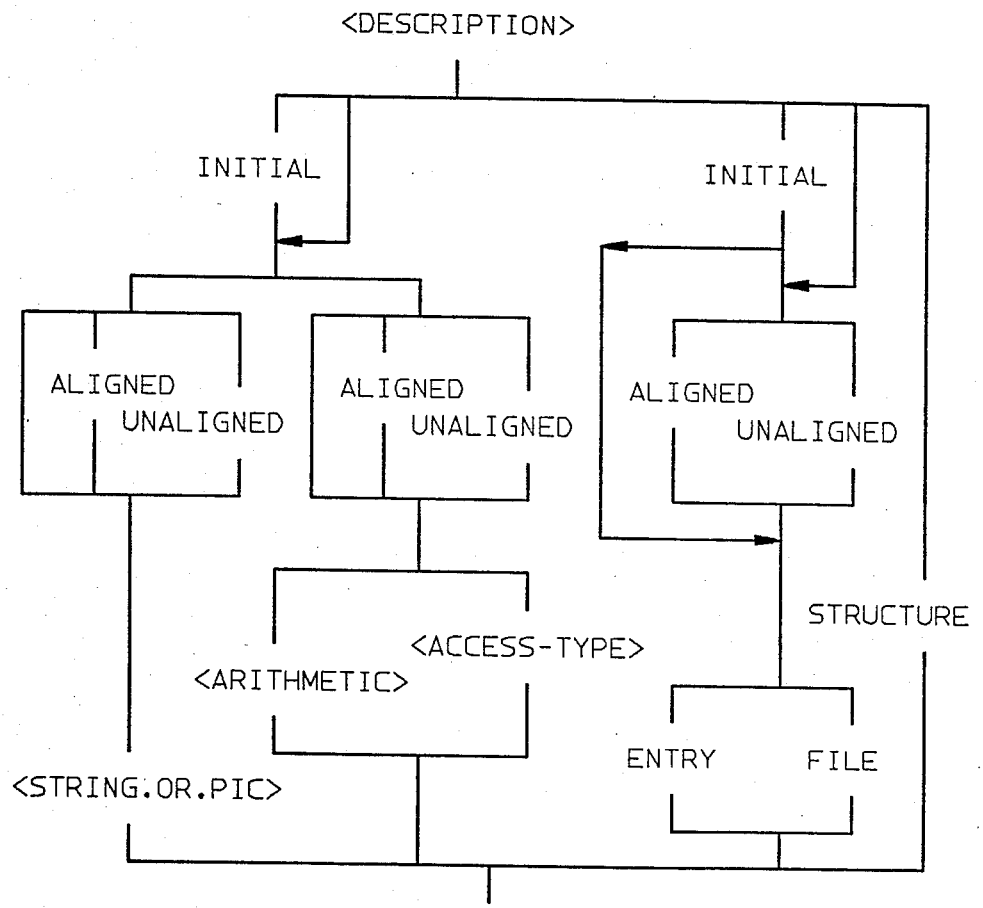
Figure 27:
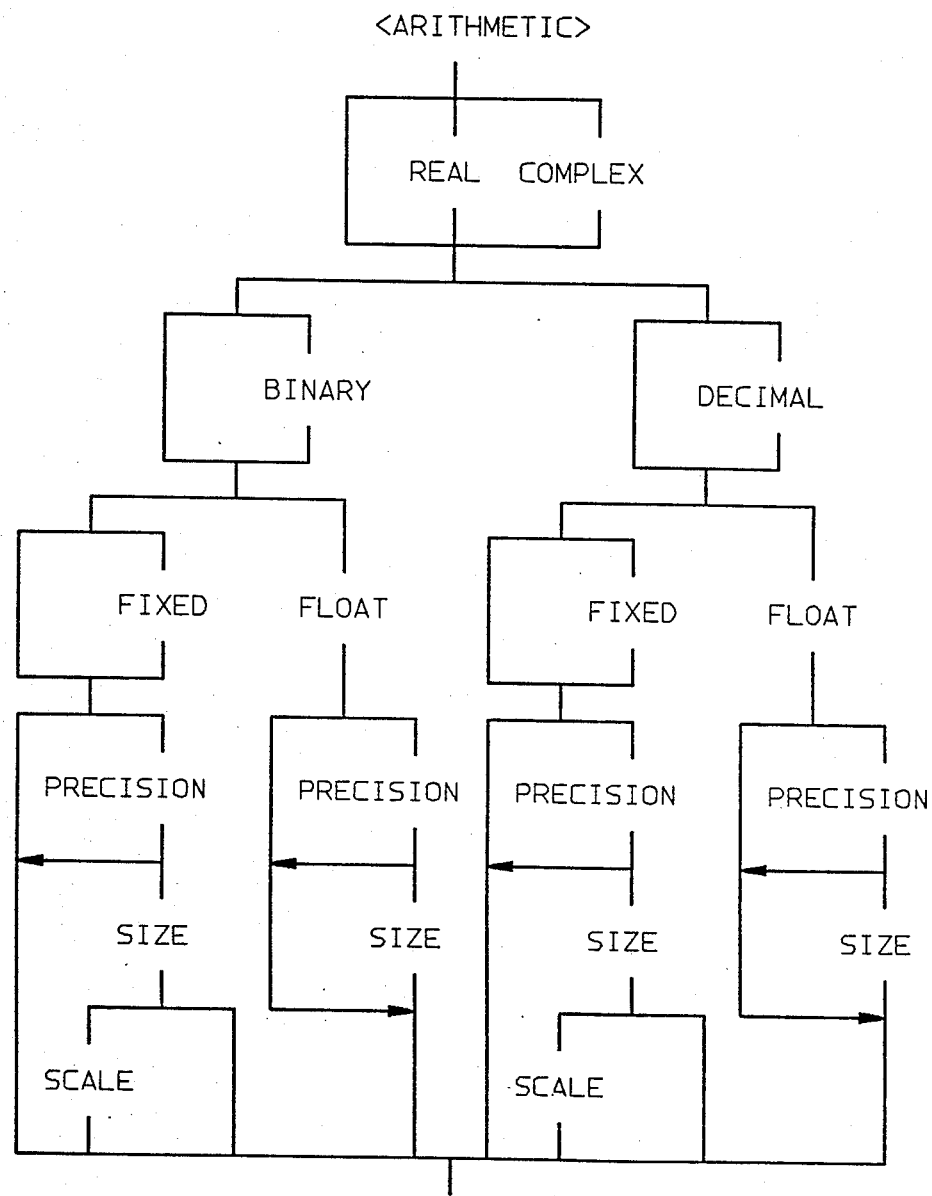
Figure 28:
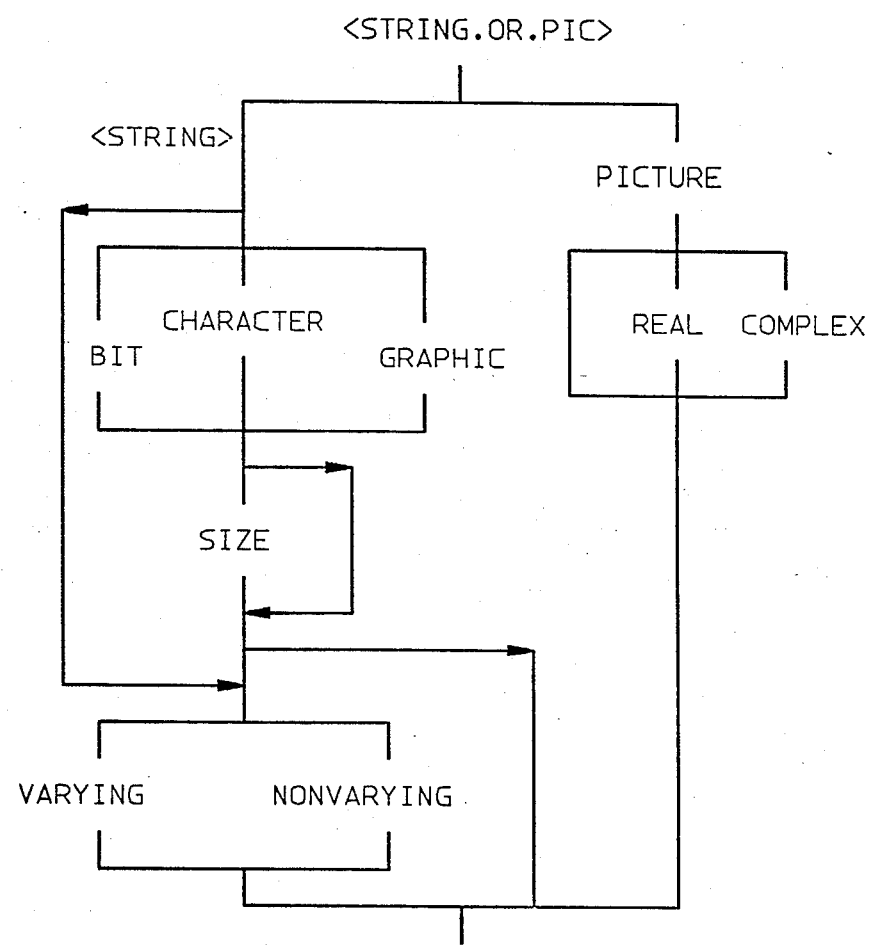
Figure 30:
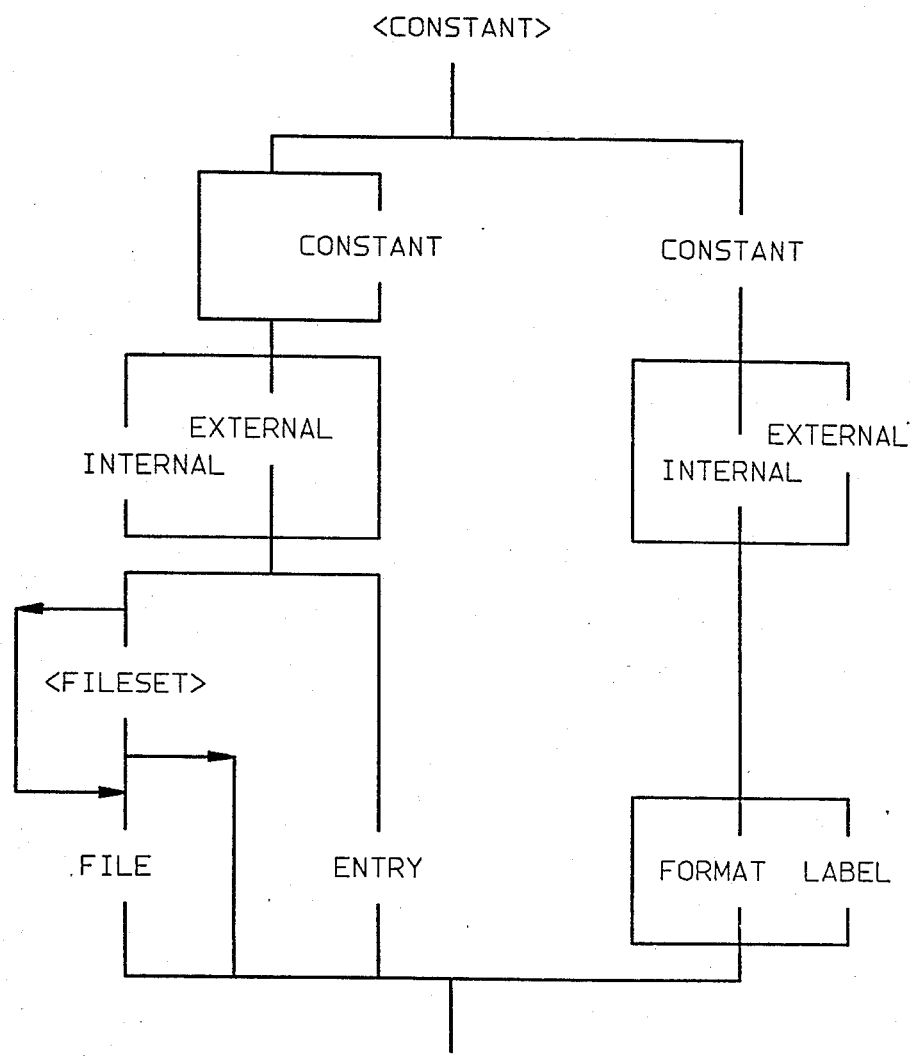
Figure 31:
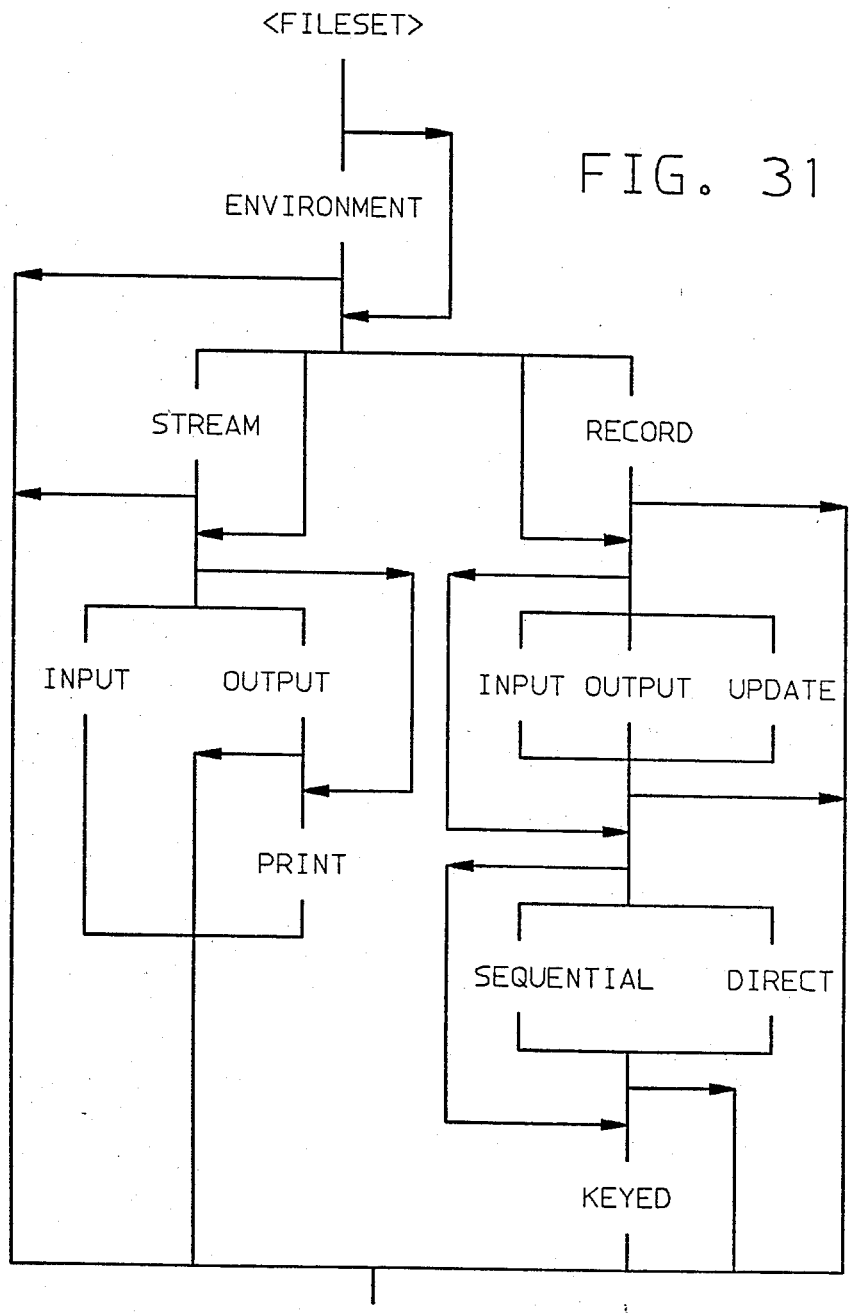
Figure 32:
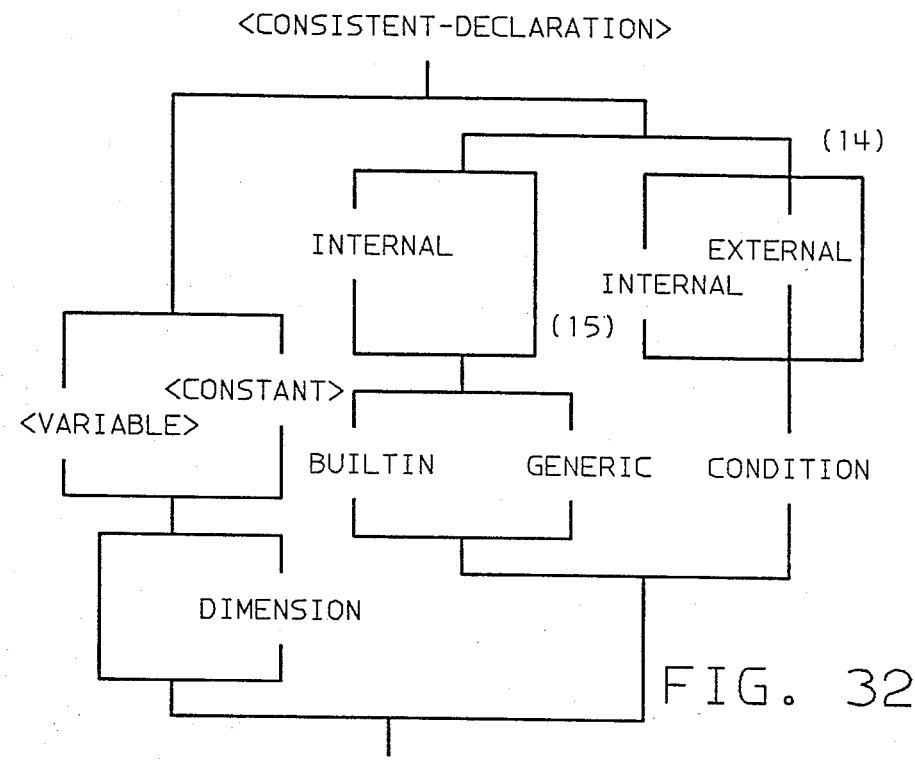
FIG. 32–41 are diagrams collectively illustrating a Group 4 grammar during a subsequent stage in the derivation of a context-free grammar for use in the present invention.

There are further lookahead problems created when optional "skips" will be added in subsequent derivation steps to be described below. First, INITIAL only goes with <variable>, so that INITIAL must be moved ahead in FIG. 6 to resolve <variable> from <constant> in case CONSTANT is left out. This is shown in FIG. 16. Also, for ENTRY as a variable, a similar situation exists with RETURNS and OPTIONS, so that these should be moved before ENTRY in the <access-type> diagram of FIG. 9. This is shown in FIG. 19. Still further, the key words in <file set> (FIG. 11) distinguish a constant FILE, so that they should come before FILE in the <constant> diagram of FIG. 10. This is shown in FIG. 20.

Finally, the INTERNAL or EXTERNAL specification is moved to assist in dealing with semantic restrictions, described below, involving EXTERNAL, GENERIC or MEMBER.

The Group 2 grammar would be effective for checking that a given attribute set is consistent and complies with all incorporated semantic restrictions.

The next stage in the grammar derivation is a Group 3 grammar obtained by extending the Group 2 grammar in such a way that it would allow all subsets of attributes that could be used with each attribute. More particularly, while the Group 2 grammar would result in a list of all attributes which could result by following any particular "path" through the Group 2 grammar, not all attributes in any given attribute set need be specified. The Group 3 grammar incorporates "skips" needed for bypassing certain optional attributes in order to accommodate the allowable attribute subsets. Some additional semantic restrictions omitted from the Group 2 grammar are also incorporated into the Group 3 grammar.

The Group 3 grammar is collectively illustrated in FIGS. 22-31, which correspond to FIGS. 12-21, respectively. The syntax illustrated in FIGS. 22-31 is basically the same as the Group 2 grammar of FIGS. 12-21 except that it allows any subset of key words allowed by the Group 2 grammar. To prevent ambiguity, some factoring and other modifications are required. Some choices for uniqueness are done to facilitate the DEFAULT processing to be added in a subsequent grammar derivation step. For instance, ENTRY or FILE occurring alone (i.e., without INITIAL, ALIGNED, OR UNALIGNED) belong only in the syntax for <constant> (FIGS. 20 and 30), while FORMAT or LABEL occurring alone (i.e., without CONSTANT) belong only in <access-type> (FIG. 19) within <variable> (FIGS. 15-19). Thus, ENTRY and FILE occurring alone are removed from <access-type> within <data-description> (FIGS. 16-19) leaving <description> (FIGS. 26-29). Further comparison of the <data-description> and <description> diagrams shows that the alignment attribute for strings and pictures is separated out for special treatment, to be described later, and the ENTRY and FILE attributes are treated specially so that they cannot occur alone (otherwise they would belong in the <constant> diagram).

In addition, paths are modified in accordance with Step 4 of §4,3,6.1 of the ANSI PL/I standard, which dictates that EXTERNAL never occurs with GENERIC or MEMBER.

Figure 42:
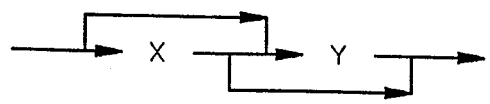
FIG. 42 illustrates a construct used for avoiding null paths when adding "skips" in the Group 3 grammar.
Figure 43:
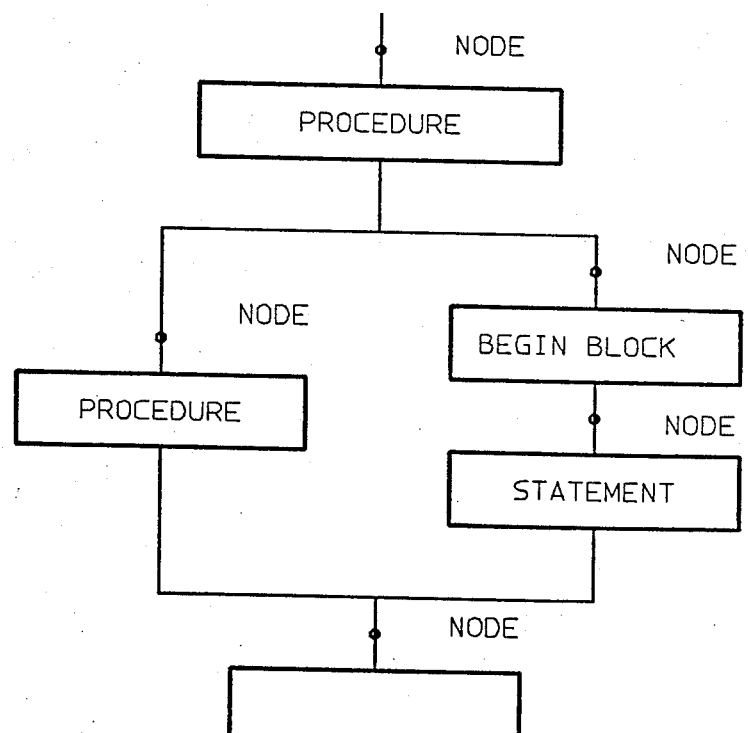
FIG. 43 is a brief diagram illustrating the flowchart-type form characteristic of a typical computer program.

The rest of the changes involve the provision of unambiguous skips. More particularly, one way to allow subsets of attributes would be to provide an optional skip over each keyword. However, this would result in an ambiguity which would be incompatible with the LALR(1) grammar processor, due to the occurrence of multiple null paths. In order to avoid this problem, the construct as shown in FIG. 42 is used. The arrangement shown in Figure 42 will allow either x or y, or both, but does not allow the null path. Note, for instance, that the <file set> diagram of FIG. 31 includes no null paths, yet the allowable paths include any ordered subset of keywords in <file set>.

The Group 3 grammar of FIGS. 22-31 could be used for checking that a given attribute set is consistent, even though some of its attributes might be missing, and for checking that the set complies with all ANSI semantic restrictions.

The next step in the grammar derivation is to derive a Group 4 grammar by augmenting the grammar syntax tree of Group 3 with references to sets of default attributes, and by including some of the final completeness checks found in §4.3.7.1 of the ANSI PL/I standard. In FIGS. 32-41, which correspond respectively to FIGS. 22-31, the numbers in the skip paths refer to the system default statements set forth in the SYSTEM DEFAULT TABLE below, in which the "|" symbol represents a logical OR and the "-" symbol indicates NOT.

---
SYSTEM DEFAULT TABLE
---

1. DEFAULT (RETURNS)
   ENTRY;
2. DEFAULT (DIRECT|INPUT|KEYED|OUTPUT|
   PRINT|RECORD|SEQUENTIAL|STREAM|UPDATE)
   FILE;
3. DEFAULT (~CONSTANT & ~PICTURE)
   FIXED, BINARY, REAL;
4. DEFAULT (FIXED & BINARY &
   ~CONSTANT) PRECISION(d1,0);
5. DEFAULT (FIXED & DECIMAL &
   ~CONSTANT) PRECISION(d2,0);
6. DEFAULT (FLOAT & BINARY &
   ~CONSTANT) PRECISION(d3);
7. DEFAULT (FLOAT & DECIMAL &
   ~CONSTANT) PRECISION(d4);
8. DEFAULT (CHARACTER|BIT|GRAPHIC)
   CHARACTER(1), BIT(1), GRAPHIC(1), NONVARYING;
9. DEFAULT (AREA)
   AREA(d5);
10. DEFAULT (POSITION)
    POSITION(1);
11. DEFAULT ((ENTRY|FILE) &
    (AUTOMATIC|BASED|DEFINED|PARAMETER|
    STATIC|CONTROLLED|MEMBER|ALIGNED|
    UNALIGNED|INITIAL))
    VARIABLE;
12. DEFAULT ((ENTRY|FILE) & RANGE(*))
    CONSTANT;
13. DEFAULT (RANGE(*) & ~CONSTANT)
    VARIABLE;
14. DEFAULT (CONDITION|((FILE|ENTRY) &
    CONSTANT)) EXTERNAL;
15. DEFAULT (RANGE(*))
    INTERNAL;
16. DEFAULT (VARIABLE & EXTERNAL)
    STATIC;
17. DEFAULT (VARIABLE)
    AUTOMATIC;
18. DEFAULT ((CHARACTER|BIT|PICTURE) &
    ~CONSTANT) UNALIGNED;
19. DEFAULT (~CONSTANT)
    ALIGNED

---

Figure 37:
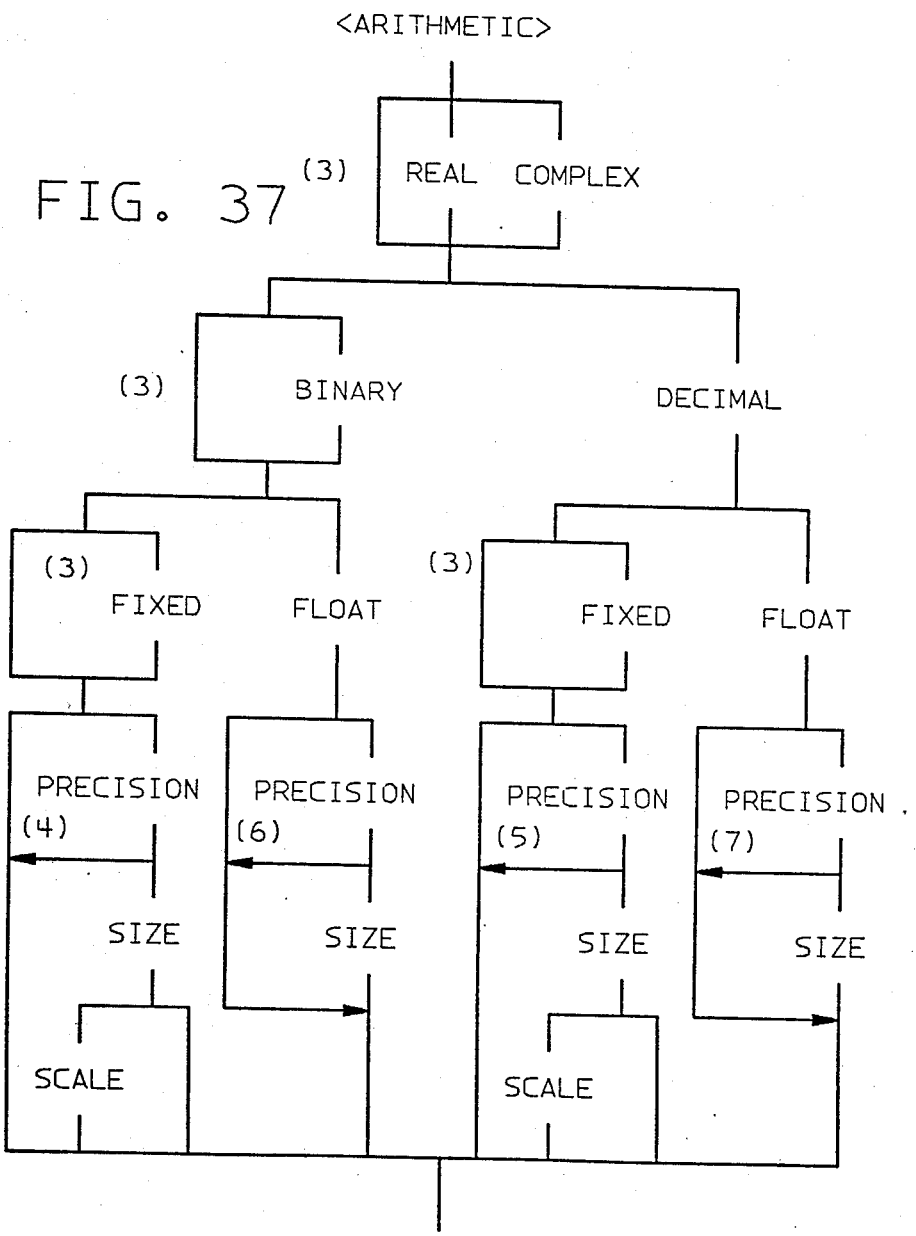
Figure 38:
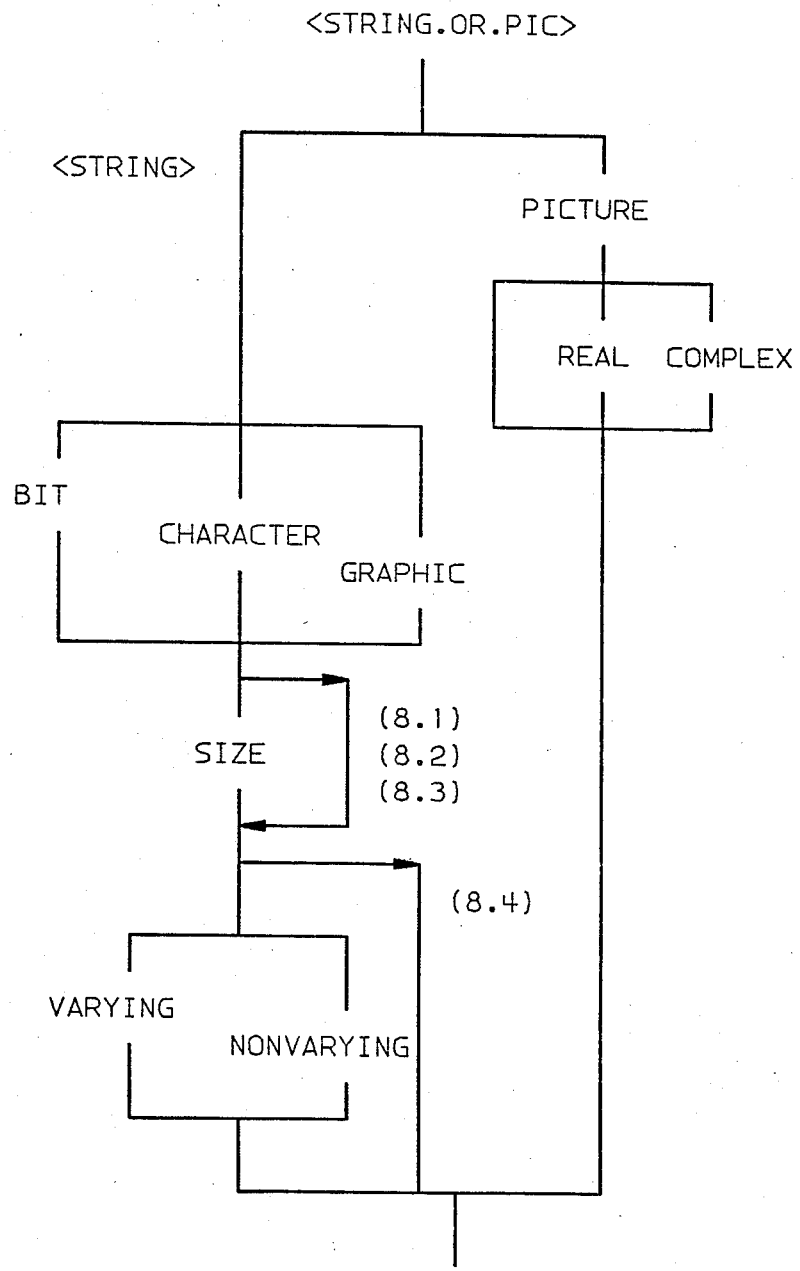
Figure 39:
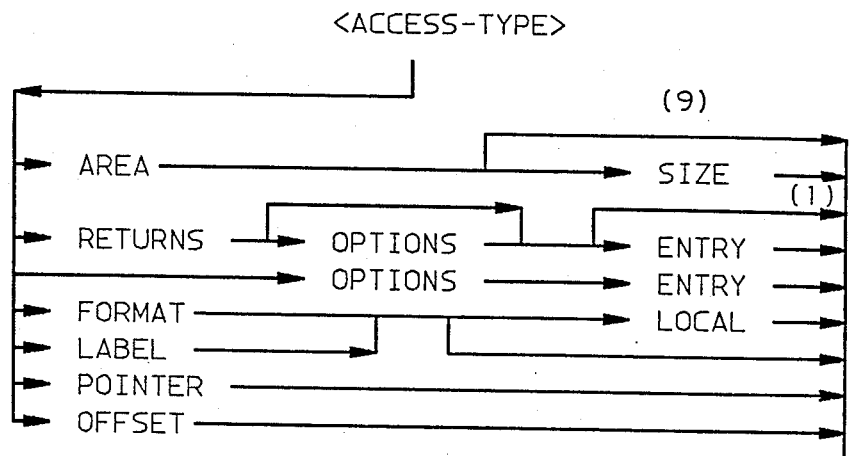
Figure 40:
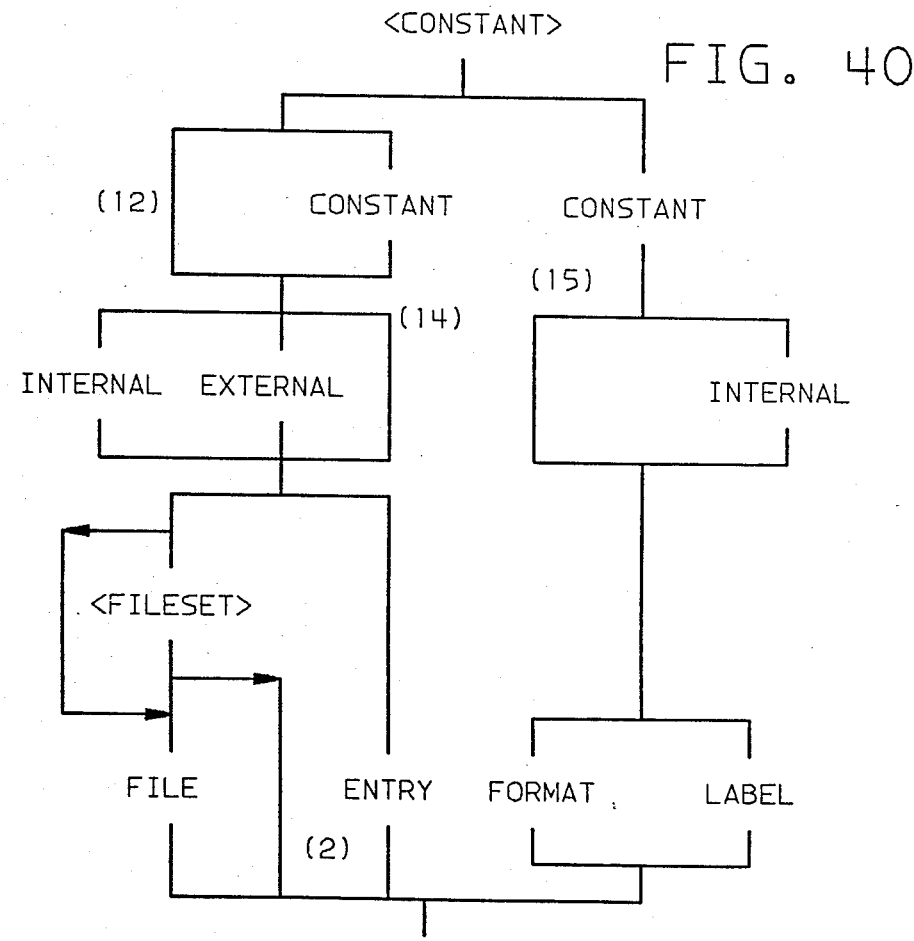
Figure 41:
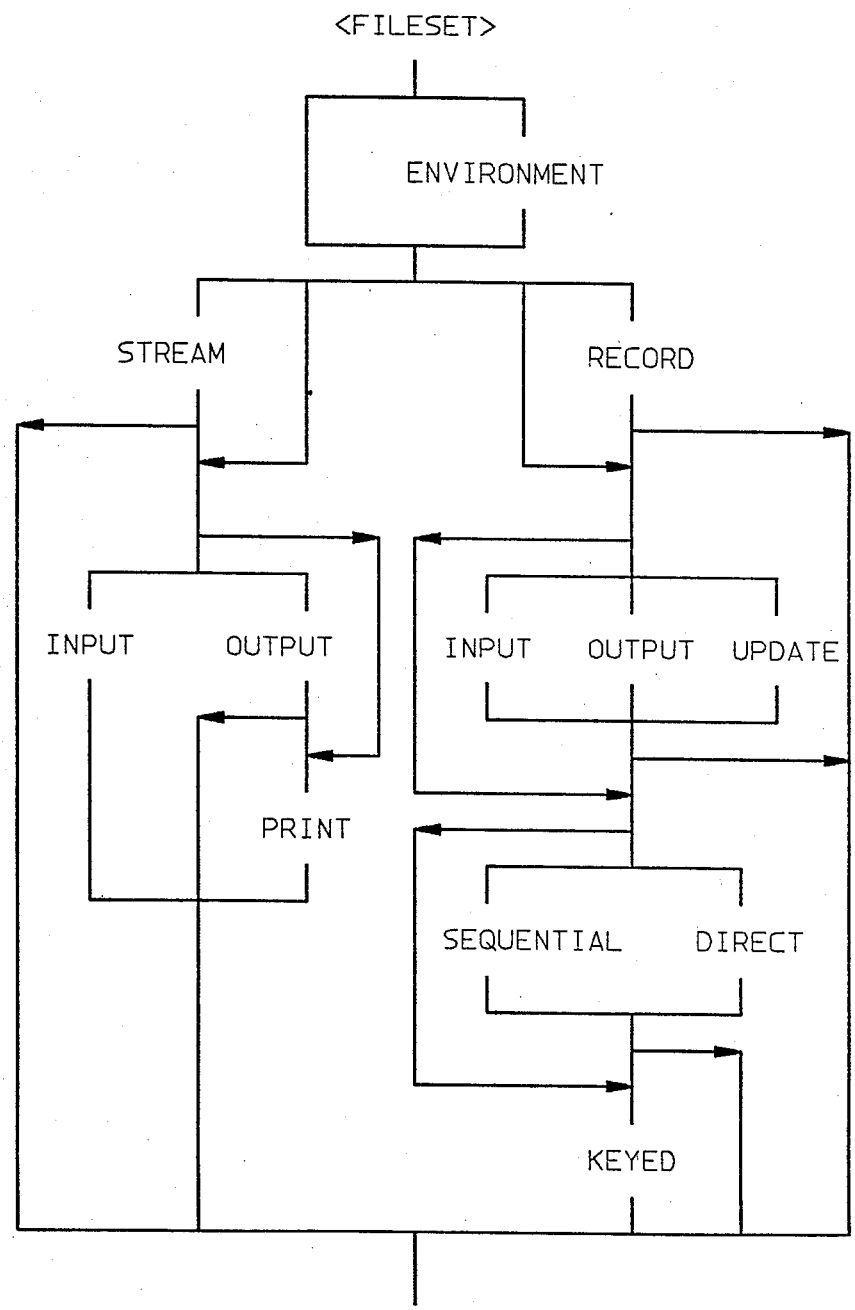

Note that in the <arithmetic> diagram of FIG. 37, each of the double skips around SIZE uses the given default, since if only PRECISION is present, the "test-invalid-duplicates" procedure described in §4.3.6.2 of the ANSI PL/I standard allows the addition of either SIZE or SIZE and SCALE.

Figure 35:
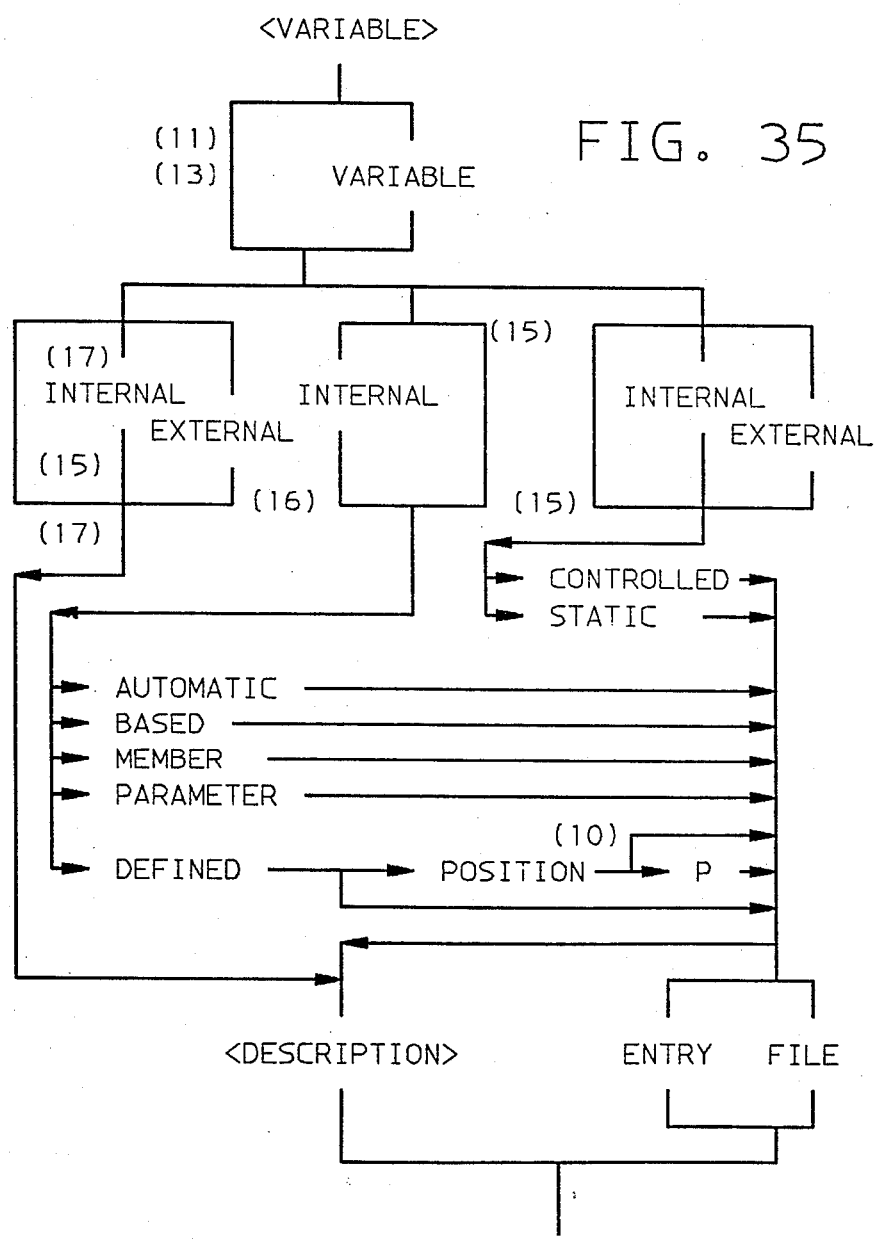

Aside from adding the default table numbers and separating the skip path on the left side of <variable> in FIG. 35, the only changes from the Group 3 grammar of FIGS. 22-31 are the modification of some paths to exclude some cases made illegal by the "final" checks found in §4.3.7.1 of the Standard. For example, step 3 of §4.3.7.1 states that EXTERNAL cannot occur with AUTOMATIC, BASED, DEFINED, PARAMETER or BUILTIN, and step 4 of §4.3.7.1 states the combination of EXTERNAL and CONSTANT cannot occur together with either FORMAT or LABEL. Also, some illegal single attributes are removed, i.e., POSITION, CONSTANT, ENVIRONMENT, VARYING, NON-VARYING, LOCAL, and OPTIONS.

Figure 33:
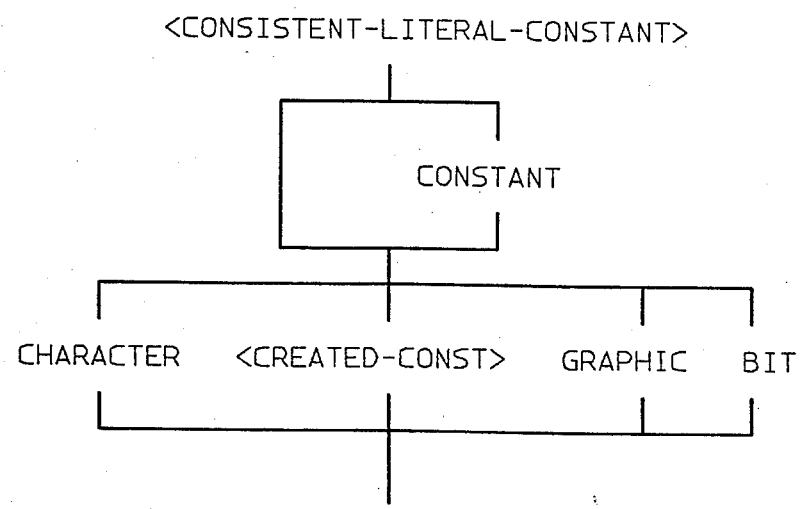
Figure 34:
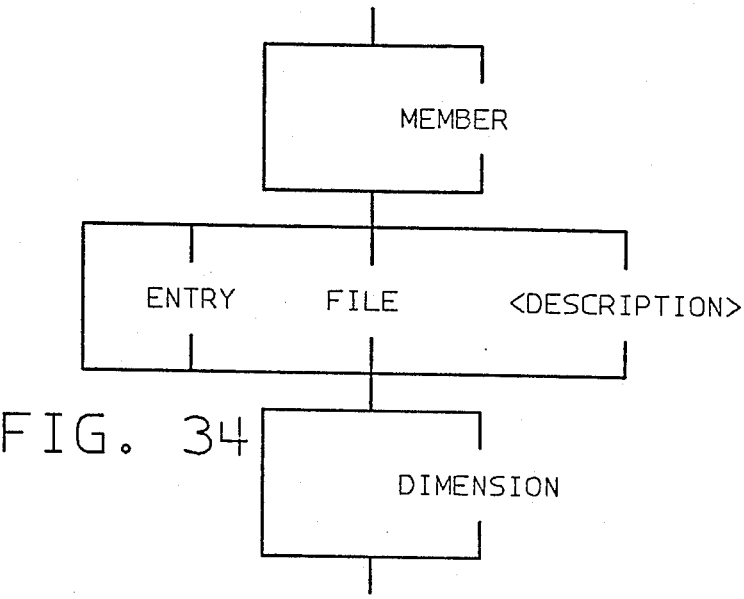
Figure 36:
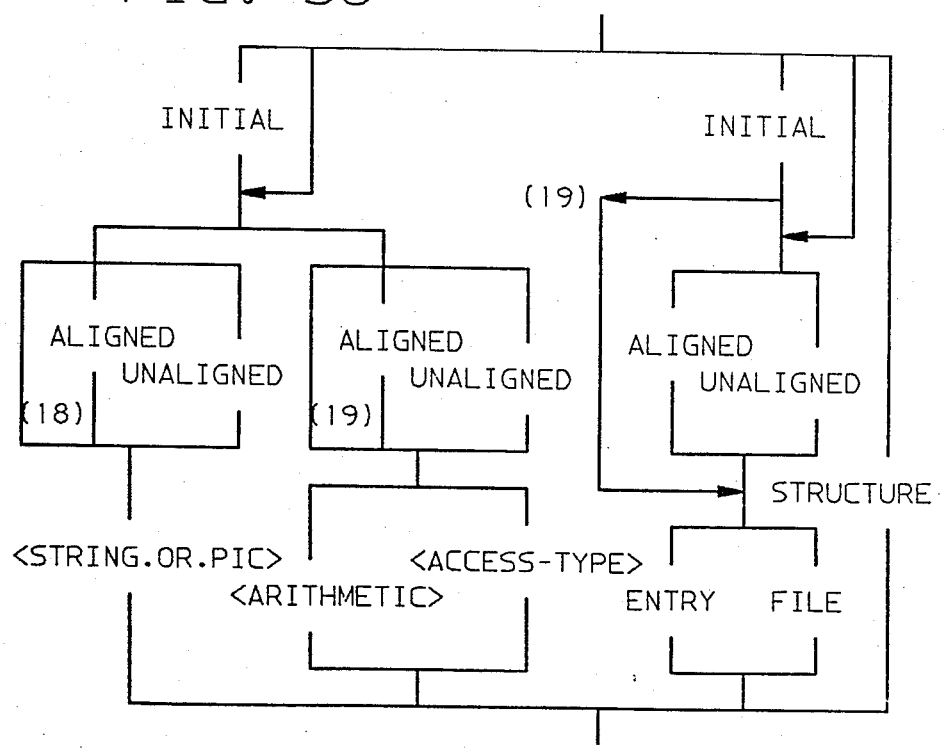

Note that in the syntax for "<constant-literal-constant>" in FIG. 33, <arithmetic> has now been changed to <created-const>. This <created-const> identifies a literal, which has different defaulting rules than those for variables. The adding of default attributes for literals could be performed in a conventional manner, or the attribute bute defaulting syntax for literals could be derived from "create-constant" in §4.4.7 of the ANSI PL/I standard. The derivation would be performed in a manner similar to that described above for variables, and need not be described in detail here for a complete understanding of the invention.

The next step is to combine the Group 4 grammar with the Group 3 grammar to produce a "Group 5" grammar to be used in the attribute processor for consistency checking, applying of defaults, and verifying that the final attribute set is complete. This Group 5 grammar is illustrated in the BNF grammar to be described below.

The Group 5 grammar consists of the basic rules for checking consistency and completeness, plus the subset rules and the default rules. By using some state variables, the subset rules or the default rules, or both, may be effectively deactivated. Consequently, the one grammar can be used for the multiple purposes of:

Basic: consistency and completeness check;
Basic and subset: consistency check only;
Basic and default: consistency and completeness with default attribute addition all at once;
Basic, subset and default: consistency with default attribute addition.

Having defined the PL/I attribute syntax structure in terms of a context-free grammar, the grammar specifications can now be converted to a Backus-Naur Form (BNF) grammar in a well-known manner and provided to a grammar processor, preferably a LALR(1) processor, which will generate the syntax tables and parse driver which make up the table-driven attribute parser according to this invention. In the operation of the LALR(1) processor, a "lexical scanner" will be used to supply encoded attributes to the grammar processor as tokens in a canonical order, i.e., an order consistent with the syntax. For example, the token ordering may be as given below in the TOKEN ORDER TABLE.

---
TOKEN ORDER TABLE
---

| | |
|---|---|
| %token | VARIABLE CONSTANT |
| %token | INTERNAL EXTERNAL |
| %token | AUTOMATIC BASED CONTROLLED STATIC MEMBER PARAMETER DEFINED |
| %token | POSITION |
| %token | P |
| %token | INITIAL |
| %token | ALIGNED UNALIGNED |
| %token | ENVIRONMENT |
| %token | STREAM RECORD |
| %token | INPUT OUTPUT UPDATE |
| %token | PRINT |
| %token | SEQUENTIAL DIRECT |
| %token | KEYED |
| %token | RETURNS |
| %token | OPTIONS |
| %token | BUILTIN CONDITION GENERIC |
| %token | STRUCTURE |
| %token | ENTRY FILE FORMAT LABEL |
| %token | AREA POINTER OFFSET |
| %token | CHARACTER BIT GRAPHIC PICTURE |
| %token | REAL COMPLEX |
| %token | DECIMAL BINARY |
| %token | FIXED FLOAT |
| %token | PRECISION |
| %token | SIZE |
| %token | SCALE |

| TOKEN ORDER TABLE | |
|---|---|
| %token | VARYING NONVARYING |
| %token | LOCAL |
| %token | DIMENSION |
| %token | END |

With this ordering the BNF grammar may be defined as follows.

Note that the non-terminals are all lower case, and associated actions are in { }. For example, the notation

```
{add: <attribute>
}
``` indicates the system default addition of the particular attribute mentioned to the existing set of attributes. The "subset" rules are within comment delimiters, i.e., /* .. . */ and the "default rules" are those with an associated "add" action. The subset production rules in comments are legal for checking consistency, but not for checking a final set of attributes when there are no more user default attributes to be added.

| BNF GRAMMAR | | |
|---|---|---|
| pgm: | decl.list ; | |
| decl.list: | decl. \| decl.list decl ; | |
| decl: | decl.type END {declaration valid } ; | |
| opt.int.extrn: | INTERNAL \| EXTERNAL \| {(add:internal } ; | |
| opt.ext.intrn: | INTERNAL \| EXTERNAL \| {add: external } ; | |
| opt.intrn: | INTERNAL \| {add: internal } ; | |
| decl.type: | variable \| variable \| const \| const \| opt.ext.intrn \| opt.intrn \| opt.intrn ; | DIMENSION DIMENSION CONDITION BUILTIN GENERIC |
| variable: | explicit.var \| implicit.var {add: variable } ; | |
| explicit.var: | VARIABLE storage \| VARIABLE {add: internal add: auto } \| VARIABLE INTERNAL {add: auto } \| VARIABLE EXTERNAL {add: static } \| VARIABLE storage \| VARIABLE storage ; | data.desc data.desc data.desc. data.desc ENTRY FILE |
| implicit.var: | storage data.desc \| data.desc. {add: internal add: auto } \| INTERNAL data.desc {add: auto } \| EXTERNAL data.desc {add: static } \| storage ENTRY | |

| BNF GRAMMAR | | |
|---|---|---|
| | \| storage FILE ; | |
| init.or.align: | INITIAL align | |
| | \| INITIAL {add: aligned } | |
| | \| align ; | |
| storage: | opt.int.extrn | CONTROLLED |
| | \| opt.int.extrn | STATIC |
| | \| opt.intrn ; | stor.type |
| stor.type: | AUTOMATIC | |
| | \| BASED | |
| | \| DEFINED POSITION | opt.pos.value |
| | \| DEFINED | |
| /* | \| POSITION | */ |
| | \| PARAMETER | |
| | \| MEMBER ; | |
| opt.pos.value: | P {add: position-value = 1 } | \| |
| | ; | |
| data.desc: | STRUCTURE | |
| | \| INITIAL data.type | |
| | \| data.type | |
| | \| init.or.align ENTRY | |
| | \| init.or.align FILE ; | |
| opt.align: | ALIGNED | |
| | \| UNALIGNED | |
| | \| {add: aligned } ; | |
| align: | ALIGNED | |
| | \| UNALIGNED ; | |
| data.type: | opt.align arith | |
| | \| opt.align noncomp | |
| | \| string {add: unaligned } | |
| | \| align string | |
| | \| pictured {add: unaligned } | |
| | \| align pictured ; | |
| noncomp: | AREA {add: size = 1 } | |
| | \| AREA SIZE | |
| | \| RETURNS OPTIONS ENTRY | |
| | \| RETURNS OPTIONS {add: entry } | |
| | \| RETURNS ENTRY | |
| | \| OPTIONS ENTRY | |
| | \| RETURNS {add: entry } | |
| | \| FORMAT LOCAL | |
| | \| FORMAT | |
| | \| LABEL LOCAL | |
| | \| LABEL | |
| /* | \| LOCAL | */ |
| | \| POINTER | |
| | \| OFFSET ; | |
| arith: | mode arith.rest ; | |
| mode: | REAL | |
| | \| COMPLEX | |
| | \| {add: real } ; | |
| arith.rest: | opt.bin opt.fixed | precision.4 |
| | \| DECIMAL opt.fixed | precision.5 |

| BNF GRAMMAR | | |
|---|---|---|
| | -continued | |
| | \| opt.bin FLOAT | precision.6 |
| | \| DECIMAL FLOAT | precision.7 |
| | ; | |
| opt.bin: | BINARY | |
| | \| | |
| | {add: binary | |
| | } | |
| | ; | |
| opt.fixed: | FIXED | |
| | \| | |
| | {add: fixed | |
| | } | |
| | ; | |
| precision.4: | PRECISION SIZE SCALE | |
| | \| PRECISION SIZE | |
| | \| PRECISION | |
| | {add: size= d1, scale= 0 | |
| | } | |
| | \| | |
| | {add: precision, size= d1, | |
| | scale= 0 | |
| | } | |
| | ; | |
| precision.5: | PRECISION SIZE SCALE | |
| | \| PRECISION SIZE | |
| | \| PRECISION | |
| | {add: size= d2, scale= 0 | |
| | } | |
| | \| | |
| | {add: precision, size= d2, | |
| | scale= 0 | |
| | } | |
| | ; | |
| precision.6: | PRECISION SIZE | |
| | \| PRECISION | |
| | {add: size= d3 | |
| | } | |
| | \| | |
| | {add: precision, size= d3 | |
| | } | |
| | ; | |
| precision.7: | PRECISION SIZE | |
| | \| PRECISION | |
| | {add: size= d4 | |
| | } | |
| | \| | |
| | {add: precision, size= d4 | |
| | } | |
| | ; | |
| string: | char.bit variance | |
| | \| char.bit | |
| | {add: nonvarying | |
| | } | |
| /* | variance | */ |
| | ; | |
| char.bit: | CHARACTER SIZE | |
| | \| CHARACTER | |
| | {add: length 1 | |
| | } | |
| | \| BIT SIZE | |
| | \| BIT | |
| | {add: length 1 | |
| | } | |
| | \| GRAPHIC SIZE | |
| | ; | |
| variance: | VARYING | |
| | \| NONVARYING | |
| | ; | |
| pictured: | PICTURE REAL | |
| | \| PICTURE COMPLEX | |
| | \| PICTURE | |
| | ; | |
| const: | explicit.const | |
| | \| implicit.const | |
| | {add: constant | |
| | } | |
| | ; | |
| explicit.const: | CONSTANT opt.intrn | FORMAT |
| /* | \| CONSTANT EXTERNAL | FORMAT */ |
| | \| CONSTANT opt.intrn | LABEL |
| /* | \| CONSTANT EXTERNAL | LABEL */ |

-continued
BNF GRAMMAR

|  |  |  |
|---|---|---|
|  | \| CONSTANT opt.ext.intrn | ENTRY |
|  | \| CONSTANT opt.ext.intrn fileset | FILE |
|  | \| CONSTANT opt.ext.intrn fileset {add: file } |  |
|  | \| CONSTANT opt.ext.intrn | FILE |
|  | ; |  |
| implicit.const: | opt.ext.intrn | ENTRY |
|  | \| opt.ext.intrn fileset | FILE |
|  | \| opt.ext.intrn fileset {add:file } |  |
|  | \| opt.ext intrn | FILE |
|  | ; |  |
| fileset: | ENVIRONMENT filetype {add: file } |  |
|  | \| filetype {add: file } |  |
| /* | \| ENVIRONMENT */ |  |
|  | ; |  |
| input.output: | INPUT |  |
|  | \| OUTPUT |  |
|  | ; |  |
| opt.in.out.update: | INPUT |  |
|  | \| OUTPUT |  |
|  | \| UPDATE |  |
|  | \| |  |
|  | ; |  |
| filetype: | stream |  |
|  | \| record |  |
|  | \| OUTPUT | PRINT |
|  | \| input.output |  |
|  | \| input.output | record.attr |
|  | ; |  |
| stream: | STREAM input.output |  |
|  | \| STREAM OUTPUT | PRINT |
|  | \| STREAM | PRINT |
|  | \| STREAM |  |
|  | \| | PRINT |
|  | ; |  |
| record: | \| RECORD opt.in.out.update | record.attr |
|  | \| RECORD opt.in.out.update |  |
|  | \| UPDATE | record attr |
|  | \| UPDATE |  |
|  | \| | record.attr |
|  | ; |  |
| record.attr: | SEQUENTIAL KEYED |  |
|  | \| SEQUENTIAL |  |
|  | \| KEYED |  |
|  | \| DIRECT KEYED |  |
|  | \| DIRECT |  |
|  | ; |  |

Given the BNF grammar defined above, the operation of the LALR(1) grammar processor is well known and need not be described in detail herein for a complete understanding of the invention. In general, there will be a lexical scanner function associated with the dictionary structure which supplies tokens in a canonical order. The dictionary or symbol table abstraction, "dict", may have a control abstraction, or iterator:

```
all_attrs = ITER (r: name_reference) returns attr.
```

This returns all symbol attributes, for the name reference I, in the required order. The use of the construct would appear as follows:

```
complete_attrs(r):
   initialize internal state;
   FOR a: attr IN dict.all_attrs(r) DO
```

```
standard parsing algorithm
run from generated tables
END;
END complete_attrs;
```

The operation of the attribute processor of this invention will now be described, after first defining some terminology to be used in the description.

Any PL/I source code program can be represented in the form of a "program tree", which is an acyclic (loopless) graph of various nodes which represent the program. For example, there are nodes representing procedures and begin blocks, executable statements, expressions, etc., as may be conceptually illustrated in FIG. 48.

A "Block-m" will hereinafter refer to a node of the program tree, with one Block-m for every procedure and begin block defined in the PL/I source program (including the main external procedure comprising the entire program). Each Block-m node also identifies a data structure referred to as a Declaration Table which describes data items declared in the corresponding procedure or begin block.

A Declaration Table represents and describes data items declared in a procedure or begin block. There is one Declaration Table for every procedure and begin block defined in a given PL/I source program. Each table is a set of Decl-m entries, one entry for every declared data item in the procedure or begin block.

Each one of the Decl-m entries in a Declaration Table corresponds to a particular one of the data items declared in that procedure or begin block. Each Decl-m entry identifies the attributes assigned to the corresponding data item. The assigned attributes include those which have been explicitly assigned, e.g., by a DECLARE statement in the PL/I source program, as well as attributes which have been implicitly assigned, e.g., default values. The representation of a set of attributes corresponding to a data item is in the form of a structure called an Attribute Record, the components of which identify and describe the attributes in the set. For example:

The Attribute Set component of a given Attribute Record indicates which attributes are explicitly defined for this data item. This includes simple attributes, e.g., AUTOMATIC, BINARY, etc., as well as composite attributes, e.g., BASED, DEFINED, etc., which have another independent declaration associated with them.

The Subnode Set component of an Attribute Record indicates which of the composite attributes in an Attribute Set have additional descriptors called Attribute Subnodes; and The Subnodes components of the Attribute Record identifies data base objects comprising the Attribute Subnodes.

Additional terms will be described as necessary in the following description of the operation of the table-driven parser.

The attribute analysis algorithm is performed by the compiler during a traversal of the source program tree. The attribute analysis can be performed during the same traversal of the program tree in which other analysis functions are performed, e.g., the analysis of name references. The operations performed during the traversal, and the corresponding data produced in each operation, can be described as follows.

During a top-down pass, when processing a particular Block-m node representing a procedure, the formal parameters of this procedure are identified and represented by Decl-m entries. These entries are placed in the Block-m's Declaration Table. In addition, an initial set of attributes for each parameter is represented by an Attribute Record, with the composite attributes being represented by Attribute Subnodes. Each Attribute Record is placed in the corresponding Decl-m entry.

In the bottom-up pass of the compiler through the source program, the remainder of the attribute analysis algorithm is performed for all data items represented in the Declaration Table of each Block-m node. This involves the following operations:

For data items which have LIKE attributes, these attributes are expanded and the resulting additional data items are represented by Decl-m entries. These entries are placed in the Block-m's Declaration Table. In addition, an initial attribute set of each such item is represented by an Attribute Record, and the composite attributes are also represented by Attribute Subnodes. Each Attribute Record is placed in the corresponding Decl-m entry. Thus, at this point, the Declaration Table represents all data items that are to be subjected to the final attribute analysis by the attribute parser.

Next, for every data item represented in the final Declaration Table, the attribute parser is invoked to perform the following steps:
Parse the initial attribute set, verifying its syntax and performing the initial semantic checks;
Complete the attribute set by applying default values; and
Check the consistency and completeness of the final attribute set.

All of these functions are performed by the table-driven attribute parser, using the syntax table and parse driver produced from the PL/I context-free attribute checking grammar by the LALR (1) parser generator. The invoking of the parser from the compiler is done in a straightforward manner which need not be described to those skilled in the field of computer programming.

As can be seen from the above description, the tedious task of writing large amounts of object code to perform attribute analysis in the compiler front end can be avoided by converting the attribute grammar to a context-free grammar compatible with a known grammar processor. It is known how to use such grammar processors to generate syntax tables and a parse driver for syntax checking of standard grammar, e.g., English parsing, and the same technique can be used for checking the syntax and completeness of attributes in a source program. The operation of the table-driven parser need not be described in detail for a proper understanding of the invention, since it is a substantially conventional operation merely adapted for a heretofore unrecognized application. It will be appreciated that the cumbersome task of manually generating large amounts of object code for the attribute analysis portion of the compiler front end has been substantially replaced by the task of merely expressing the attribute grammar as a context-free grammar compatible with a grammar processor. The grammar processor then generates the table-driven parser in an efficient and reliable manner. Adapting the compiler to subsequent changes in the programming language becomes a relatively straightforward matter, substantially decreasing the time required to generate a new compiler.

The invention has been described above as utilizing a LALR(1) grammar processor to generate the table-driven attribute parser, although it should be readily apparent that other grammar processor may be suitable.

It should also be noted that, although the invention has been described above for use in a PL/I compiler, the technique is equally applicable to other programming languages whose attribute grammar can be expressed as a context-free grammar compatible with the LALR (1) or some other suitable grammar processor.

What is claimed is:

1. A compiler of the type for receiving and compiling a source program in a predetermined programming language, and wherein said source program assigns attributes to data items employed in said program and said programming language including attribute grammar rules with which said attribute assignments must comply, said compiler including attribute analysis means for checking the consistency of attributes assigned to a particular data item by said program and for selectively assigning default attributes to said data items, said attribute analysis means comprising a table-driven attribute parser including a syntax table and a parse driver for verifying that said attribute assignments comply with said attribute grammar rules.

2. A compiler as defined in claim 1, wherein said table-driven attribute parser includes means for adding said default attributes to said assigned attributes to obtain a final attribute set for each data item.

3. A compiler as defined in claim 2, wherein said table-driven attribute parser includes means for checking for consistency of the various attributes in said final attribute set in accordance with said attribute grammar rules and for checking the completeness of said final attribute set in accordance with said attribute grammar rules.

4. A computer method of checking (the) for consistency of attribute assignments in a program in accordance with attribute grammar rules associated with the programming language of said program, said program being defined by a program tree having a plurality of nodes interconnected by program segments, said method including the steps of:

generating a declaration table for each program segment, said declaration table listing all data items declared in its corresponding program segment;

generating a plurality of attribute records corresponding to respective data items listed in each said declaration table, each said attribute record comprising an initial set of attributes assigned to a corresponding data item declared in said corresponding program segment;

parsing said initial set of attributes for each data item to verify the syntax of said initial attribute set and verify that said initial attribute set conforms to semantic restrictions included in said attribute grammar;

adding default values to selected attribute records to obtain final attribute sets for each said data item; and checking the consistency of said attributes in each said final attribute set in accordance with said attribute grammar rules and the completeness of each final attribute set in accordance with said attribute grammar rules.

5. A computer method of checking for consistency and completeness of attribute assignments in a program expressed in a predetermined programming language, said programming language having an associated set of grammar specifications defining attribute requirements, said method comprising the steps of:

generating a context-free grammar consistent with said grammar specifications;

providing said context-free grammar to a grammar processing means to obtain a table-driven attribute parser comprising a syntax table and a parse driver; and processing said program with said table-driven attribute parse to check the consistency of said attributes for compliance with said attribute grammar.

6. A method as defined in claim 5, wherein said context-free grammar incorporates default value assignments, and wherein said processing step comprises adding default values as further attribute assignments for selected data items where necessary to comply with said attribute grammar.

7. A method as defined in claim 6, wherein said processing step further comprises checking the completeness and consistency of attribute assignments with said attribute grammar after the addition of said further attribute assignments.

8. A computer method of generating a table-driven attribute parser, including a syntax table and a parse driver, for checking the consistency and completeness of attribute assignments in a source program in accordance with attribute grammar rules associated with the programming language of said source program, said method comprising the steps of:

generating a context-free grammar in accordance with said attribute grammar; and processing said context-free grammar in a parser generator to obtain said syntax table and parse driver.

* * * * *